(12) United States Patent
Muramatsu

(10) Patent No.: US 8,159,700 B2
(45) Date of Patent: Apr. 17, 2012

(54) PRINTING SYSTEM AND CONTROL METHOD THEREOF, AND STORAGE MEDIUM THEREFOR

(75) Inventor: Mizuki Muramatsu, Machida (JP)

(73) Assignee: Canon Kabushiki Kaisha (JP)

( * ) Notice: Subject to any disclaimer, the term of this patent is extended or adjusted under 35 U.S.C. 154(b) by 986 days.

(21) Appl. No.: 11/689,094

(22) Filed: Mar. 21, 2007

(65) Prior Publication Data

US 2007/0285707 A1    Dec. 13, 2007

(30) Foreign Application Priority Data

Apr. 5, 2006    (JP) ................................. 2006-104718

(51) Int. Cl.
*G06F 3/12* (2006.01)
*G06K 15/00* (2006.01)

(52) U.S. Cl. ...................................... 358/1.15; 358/1.14
(58) Field of Classification Search .......................... None
See application file for complete search history.

(56) References Cited

U.S. PATENT DOCUMENTS

| 6,421,138 | B1* | 7/2002 | McIntyre ...................... 358/1.16 |
| 2003/0226885 | A1* | 12/2003 | Harris ............................ 235/375 |
| 2005/0122540 | A1* | 6/2005 | Kadowaki ..................... 358/1.15 |
| 2005/0152711 | A1* | 7/2005 | Yokobori et al. ............... 399/82 |
| 2005/0168769 | A1* | 8/2005 | Kim et al. ..................... 358/1.14 |
| 2006/0077418 | A1* | 4/2006 | Nakajima et al. ............ 358/1.14 |
| 2006/0242568 | A1* | 10/2006 | Gatto ............................ 715/517 |
| 2007/0002352 | A1* | 1/2007 | Ushio et al. .................. 358/1.13 |

FOREIGN PATENT DOCUMENTS

| JP | 2000132368 A * | 5/2000 |
| JP | 2005-165722 A | 6/2005 |

* cited by examiner

*Primary Examiner* — Benny Tieu
*Assistant Examiner* — Fan Zhang
(74) *Attorney, Agent, or Firm* — Rossi, Kimms & McDowell LLP

(57) ABSTRACT

A print system comprises a bookbinding unit that is capable of executing a bookbinding job of sheets printed by a print unit, and which controls the processes such that the print unit and the bookbinding unit perform their respective processes separately from one another, rather than in series, based on identification information, when a specified instruction is received.

9 Claims, 22 Drawing Sheets

FIG. 12

CASE BINDING : DETAILED SETTINGS

CASE BINDING IS ONLY EXECUTED
PLEASE INPUT PID PRINTED ON
THE PAPER AND PASSWORD

PID  02345

Password  3haihwop2d

OK    CANCEL

FIG. 15

Printer Driver

PRINTER
- PRINTER NAME: MFP 301 ~1502  ~1501  1516~ PROPERTY
- STATUS: IDLE ~1503
- PRINTER DRIVER TYPE: XXXX YYYY
- LOCATION: ZZZZ ~1504
- NOTES: ~1505
- 1506~ ☐ OUTPUT TO FILE

PRINT RANGE
- ◉ ALL
- ○ CURRENT PAGE  ○ SELECTED PAGE
- ○ INPUT RANGE ~1508
- PLEASE DESIGNATE PAGE NUMBER BY DIVIDING USING COMMA SUCH AS 1,3,6 OR PAGE RANGE SUCH AS 4-8

NO. OF COPIES
- SELECT NO. OF COPIES: 1 ~1512
- ☑ PRINT ON PER COPY UNIT BASIS ~1513

MAGNIFICATION / REDUCTION ~1514
- NO. OF PAGES PER SHEET: 1 PAGE
- SPECIFY SHEET SIZE: ~1515  NOT DESIGNATE COPY RATIO 1507  1509
TARGET TO BE PRINTED: DOCUMENT ~1511
PRINT DESIGNATION: ALL PAGES ~1510

OK ~1517    CANCEL ~1518

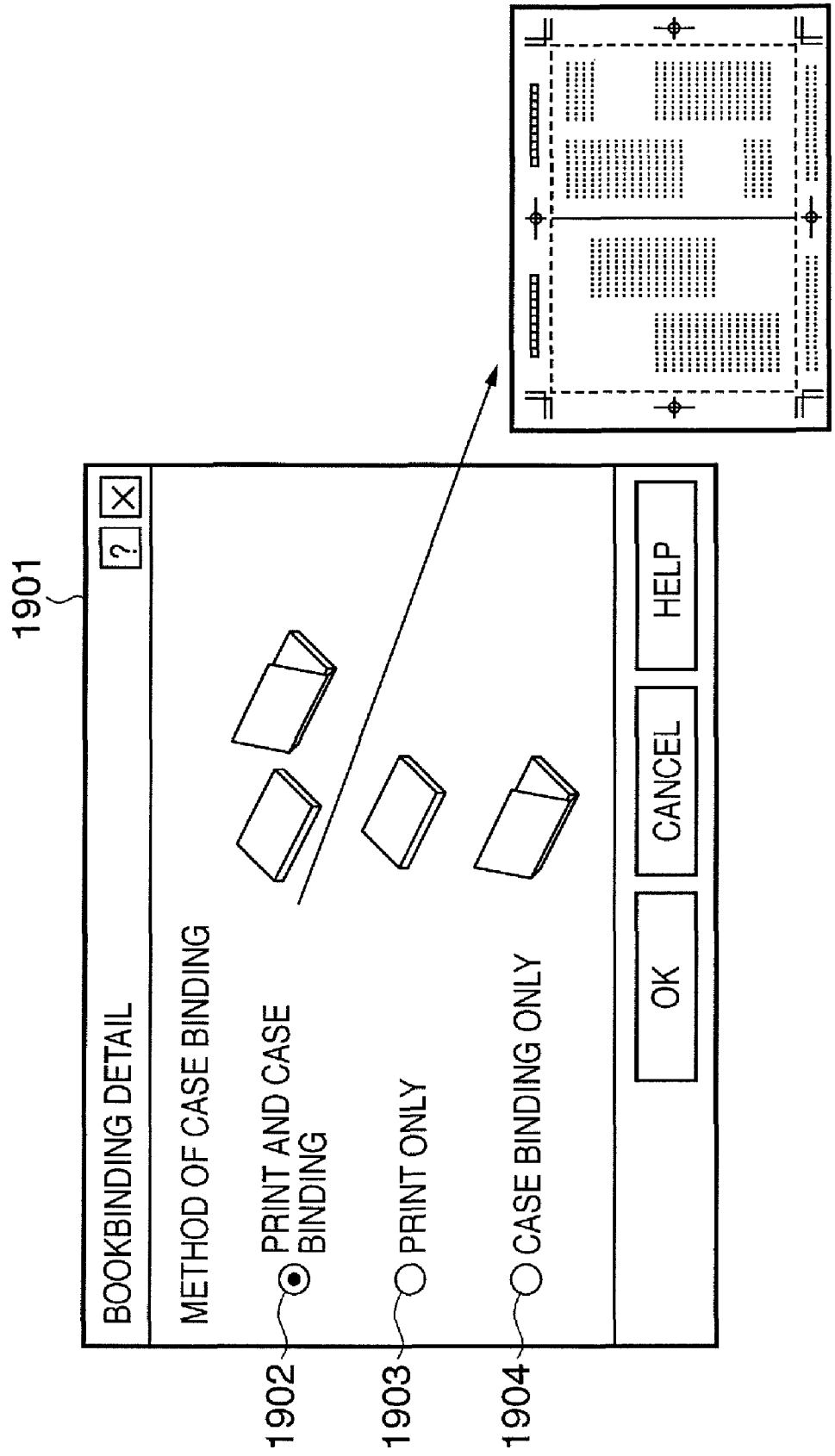

| CASE BINDING : DETAILED SETTINGS |
|---|
| PRINT OF DOCUMENTS IS ONLY EXECUTED IF CASE BINDING IS EXECUTED LATER, YOU MUST INPUT PID PRINTED ON THE PAPER AND PASSWORD SHOWN BELOW |

PID    02345

Password    3haihwop2d

OK    CANCEL

2001

PRINTING SYSTEM AND CONTROL METHOD THEREOF, AND STORAGE MEDIUM THEREFOR

BACKGROUND OF THE INVENTION

1. Field of the Invention

The present invention relates to a printing system and control method thereof, and a storage medium therefor, that control a printing process and a bookbinding process.

2. Description of the Related Art

In recent times, office equipment manufacturers in particular have been reviewing potentials for making inroads into a new sector known as the Light Production Market, or the Print-on-Demand (POD) Market; see Japanese Patent Application Laid-Open 2005-165722 (document). In addition to examining market trends, such review involves a study of more precise performance, for example, a study of a printing apparatus or a printing system that is capable of being used in a POD framework that is envisioned as having an application or a requirement that differs from the application or the requirement of an office environment. Envisioning a printing framework within such a POD Market suggests that there will be an increasing focus going forward on the extent to which productivity is increased within the printing system. It is also probable that making the printing system easier for an operator to use, while maintaining strong productivity, will take on greater importance going forward.

For example, in order to make genuine inroads into the POD market sector, office equipment manufacturers in particular will need to respond to a circumstance that differs from the office environment, taking the POD market into consideration. For example, it is necessary to perform an adequate review in order to commercialize a practical digital printing system that is optimized for the POD framework, as disclosed in the foregoing document. When envisioning a goal of the commercialization of the practical digital printing system that is optimized for the POD framework, however, it is conceivable that an issue remains when using only an assembly that is disclosed in the foregoing document. For example, when processing a large-volume job, it is necessary to take into account improving efficiency and increasing throughput in order to use a plurality of accessories, i.e., finishers, in parallel to perform post-processing. It is also possible that finishing processing of a particular type that may be envisioned within a printing framework of the POD framework, which may include a case binding finishing process, may require a significant amount of time. When considering such a circumstance, it is conceivable that, when executing a job that requires the finishing processing of the particular type that may include the case binding finishing process, not all of an operational procedure of the job may be processed as a batch. That is to say, it is possible that an arrangement may be needed executing only a print job at a present time, and using the sheets of printing paper so printed to conduct a bookbinding at a later date. As of this writing, however, no consideration is being given to such a process.

SUMMARY OF THE INVENTION

The objective of the present invention is to resolve the foregoing pre-existing problems.

The present invention is characterized by offering a printing system and control method thereof that allow controlling the print process and the bookbinding process to be performed separately from one another, and not in sequence.

According to the present invention there is provided a print system adapted to cause a bookbinding unit to execute a bookbinding process of printed sheets upon which print process is performed by a print unit, comprising:

a reception unit configured to receive a specified instruction; and a controller configured to control a print process by the print unit and a bookbinding process of printed sheets printed in the print process by the bookbinding unit to be performed separately, rather than in sequence, in accordance with identifying information, upon receipt of the specified instruction.

According to the present invention there is provided a control method for a print system adapted to execute a bookbinding process of printed sheets upon which print process is performed by a print unit, comprising the steps of:

receiving a specified instruction; and controlling a print process by the print unit and a bookbinding process of printed sheets printed in the print process by the bookbinding unit to be performed separately, rather than in sequence, in accordance with identifying information, upon receipt of the specified instruction.

The summary of the invention does not list all characteristics of the present invention, and the invention may be achieved by combining another claim that is disclosed within a scope of the claims with the characteristics thereof.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to describe the principles of the invention.

FIG. 12 depicts a view illustrating an example of a setting screen for the case binding detail settings that is displayed in the touch panel section of the MFP console unit, according to the first embodiment.

FIG. 15 depicts a view illustrating an example of a printer driver setting screen according to a third embodiment of the present invention.

FIG. 19 depicts a view illustrating an example of a setting screen for the case binding detail settings that is displayed, in a case that a bookbinding detail button is instructed in the screen depicted in FIG. 18.

DESCRIPTION OF THE EMBODIMENTS

Embodiments of the present invention will be described in detail with reference to the accompanying drawings. It should be noted that the embodiments below do not limit the present invention set forth in the claims, and that not all of the combinations of features described in the embodiments are necessarily essential as to attaining the objects of the invention. While the embodiments refer to the invention when performing an MFP process, the present invention is not limited to such an image generating or processing apparatus, and may also be fulfilled by a device that may include a conventional personal computer (PC).

First Embodiment

Figure 1:
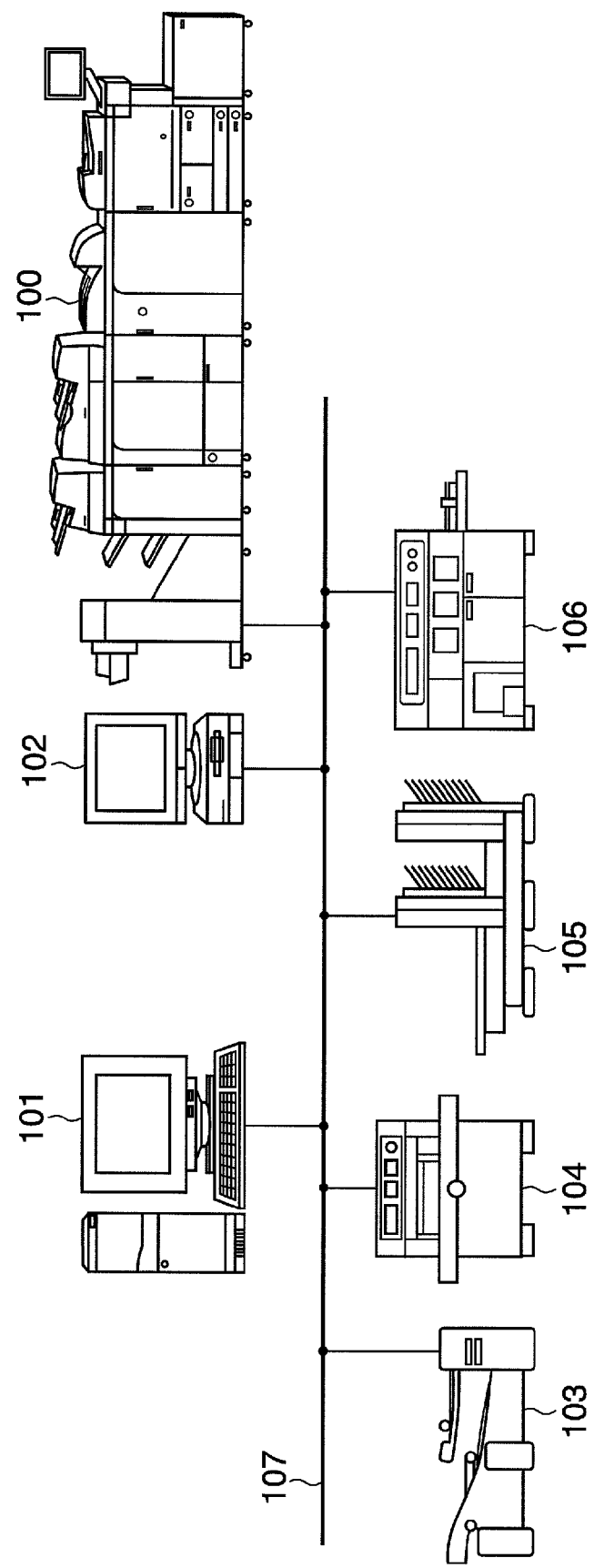
FIG. 1 is a block diagram depicting an example of a basic assembly of a printing system according to an embodiment of the present invention.

FIG. 1 is a block diagram depicting an example of a basic assembly of a printing system according to the embodiment of the present invention.

The system comprises a multi-function peripheral (MFP) system 100, a post-press server 101, and a client PC 102, together with a paper folding apparatus 103, a trimmer 104, a saddle-stitching apparatus 105 with a saddle stitch function 105, and a case binding apparatus 106, which are typical of a post-processing device, and which are connected via a network 107.

The post-press server 101 is a computer that provides overall management of the post-processing operations that are carried out by the post-processing devices. It creates a post-processing condition that is available for finishing, in accordance with, what may include a receipt of a job instruction by a server that receives a job order, or a job instruction that is outputted by an MIS server. It then directs the post-process, i.e., a finishing process, as an end user requests, according to the post-processing condition. In general, the post-press server 101 uses a Job Definition Format (JDF) or other information interchange device to interchange information such as a command or a status within the post-press server 101 with each respective post-processing device. The post-processing devices may be classified into three categories, which are defined as follows:

1. Inline Finisher

This is a post-processing device wherein a printing paper path is physically connected to an MFP of the MFP system 100, and an operator instruction for an operation or a status verification thereof is also commonly supplied to the MFP.

2. Nearline Finisher

This is a post-processing device wherein the printing paper path is not physically connected to the MFP of the MFP system 100, and an operator performs an operation that may include a transportation, or a setting of an outputted, or finished, product. It is, however, a post-processing device that is capable of electrically receiving and setting a command pertaining to the operator instruction or the status verification, via a telecommunications medium that may include the network 107.

3. Offline Finisher

Neither the printing paper path nor the operator instruction or the status verification is connected to the MFP system 100 via any telecommunications medium whatsoever. The operator manually performs an operation input of the transportation of the outputted product (printed papers), the setting of the outputted product, and an operation input manually. This is a post-processing device of a type wherein the operator visually verifies a status report that the post-processing device itself generates.

The post-processing device executes a print paper modification process, which may include a trim process, a saddle stitch bookbinding process, a case binding process, a paper folding process, a hole punch process, an insertion process, or a collating process, on a print paper that is printed by an image formation apparatus that may include the MFP. It is thus possible to modify a bookbinding settings that are provided to the end user.

The nearline finisher that the post-press server 101 administers, which may include the offline finisher, as a circumstance may warrant, includes the paper folding apparatus 103, the trimmer 104, the saddle-stitching apparatus 105, and the case binding apparatus 106, as depicted in FIG. 1. The finishers may also include a variety of devices, starting with the stapler, the hole puncher, the insertion device, or the collating device. The post-press server 101 assesses the status of a device or a job and administers the execution status of the job via a process that may include, but is not limited to, sequentially polling the near finishers according to a pre-established protocol. It is permissible for the embodiment to have an assembly that is capable of executing each of the plurality of print paper processes via a separate print paper processing apparatus, as well as an assembly that is capable of executing the plurality of print paper processes via a single print paper processing apparatus. It is also permissible to have an assembly that endows the system with any of the plurality of print paper processing apparatuses. The MFP system 100 satisfies the inline finisher assembly, and is a system that is capable of fulfilling the post-press process.

[Detailed MFP Assembly]

Figure 2:
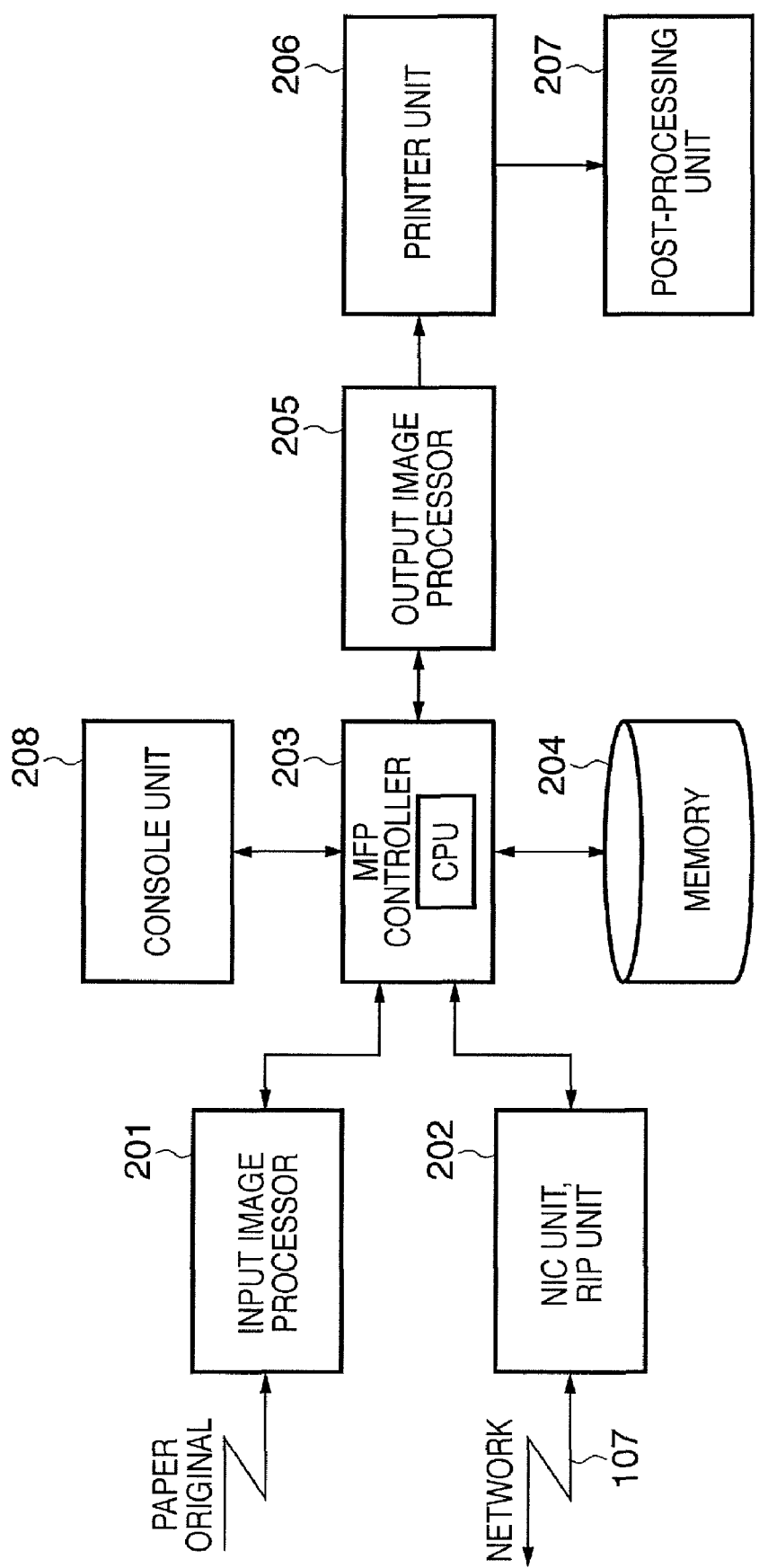
FIG. 2 is a block diagram depicting an MFP system assembly according to the embodiment.

FIG. 2 is a block diagram expressing the Multi-function Peripheral (MFP) system 100 assembly, according to the embodiment.

An input image processor 201 in FIG. 2 reads a paper original via an image readout apparatus that may include a scanner, and inputs and processes the readout image data. A Network Interface Card (NIC) unit 202 passes the image data that is inputted via the network 107, which is primarily a Page Description Language (PDL) data, to a Raster Image Processor (RIP) unit and transmits the image data or an apparatus information that is within the MFP externally, via the network 107. The RIP unit interprets the inputted PDL data and develops bitmap image data. The bitmap image data is sent to an MFP controller 203, which fulfills a role of traffic management that controls an inputted data or an outputted data. The bitmap image data that is inputted into the MFP controller 203 is temporarily stored in a memory unit 204. It is possible to read out the image data from, and write the image data to, the memory unit 204 as necessary. An output image processor 205 carries out an image processing in order for the bitmap image data to be printed by a printer unit 206. Thus is the processed imaged data sent to the printer unit 206 and printed. The printer unit 206 feeds a printed paper and forms an image thereupon in sequence that corresponds to the image data that is supplied by the output image processor 205. The printing paper that is thus printed is sent to a post-processing unit 207, whereupon a sorting process or a print paper finishing process is performed. A console unit 208 is used for selecting each respective feature set or to issue an operating instruction, via the operator's operations. An improvement in a resolution of a display apparatus of the console unit 208 allows such a usage as displaying a preview of the image data that is in the memory unit 204, and instructing to print once the operators has visually verified the display and determined that it is satisfactory. The post-processing unit 207 includes the post-processing apparatuses 302 through 304 in FIG. 3.

The MFP thus has a variety of feature sets and usage methods, examples thereof to follow, with arrows indicating a direction of a data flow therein:

A. Copy Function:
The input image processor 201->the output image processor 205->the printer unit 206
B. Network Scan:
The input image processor 201->the NIC 202
C. Network Print:
The NIC 202->the RIP 202->the output image processor 205->the printer unit 206
D. Box Scan Function:
The input image processor 201->the output image processor 205->the memory unit 204
E. Box Print Function:
The memory unit 204->the printer unit 206
F. Box Reception Function:
The NIC 202->the RIP 202->the output image processor 205->the memory unit 204
G. Box Transmission Function:
The memory unit 204->the NIC 202
H. Preview Function:
The memory unit 204->the console unit 208

Figure 3:
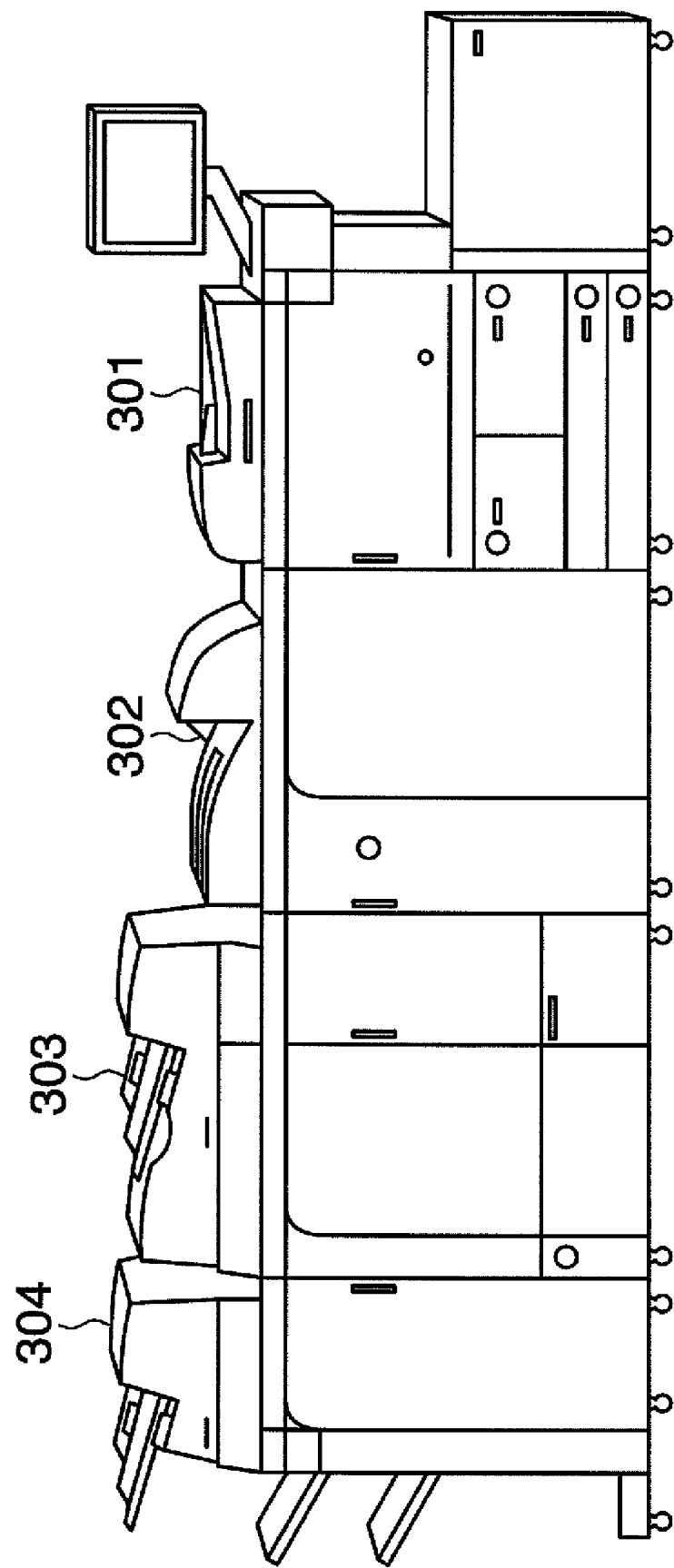
FIG. 3 depicts a view illustrating an MFP system assembly according to the embodiment.

FIG. 3 depicts a view illustrating the MFP system 100 assembly according to the embodiment. The MFP system 100 is equipped with an MFP 301 and a suite of associated post-processing devices 302 through 304, which are in turn equipped with a plurality of print paper processing devices that are capable of executing a different print paper process in a mutual fashion.

The MFP system 100 is constituted so as to be capable of feeding the sheet of printed paper that is printed in a printer unit of the MFP 301 from the MFP 301 to the plurality of print paper processing devices, i.e., the post-processing devices. The plurality of print paper processing devices are constituted so as to be capable of connecting in a series format that allows receipt of the sheet of printed paper that is fed by the MFP 301. Hence, when feeding a printed paper from the printer unit 206 of the MFP 301 to a print paper processing device that is downstream in a print paper feeding direction, for example, an inserter 304, the print paper is fed via an internal paper feed unit of a print paper processing device that is upstream from the print paper processing device in the print paper feeding direction, for example, a case binding unit 303. Additionally, each respective print paper processing device is constituted so as to be capable of executing, by way of a print paper processing unit with which each respective print paper processing device is equipped, a print paper process that each respective print paper processing device is capable of executing on the printed paper that is printed by the printer unit 206.

The system is thus constituted, predicated on such constitution as the preceding, so as to be capable of having each respective print paper processing device execute its specified print paper process on the printed paper that is printed by the printer unit 206. For example, a stacker 302 is equipped with a loading tray that is capable of moving in a vertical orientation. Using the unit, it is possible to load a large volume of the printed paper that is printed by the printer unit 206.

Figure 4:
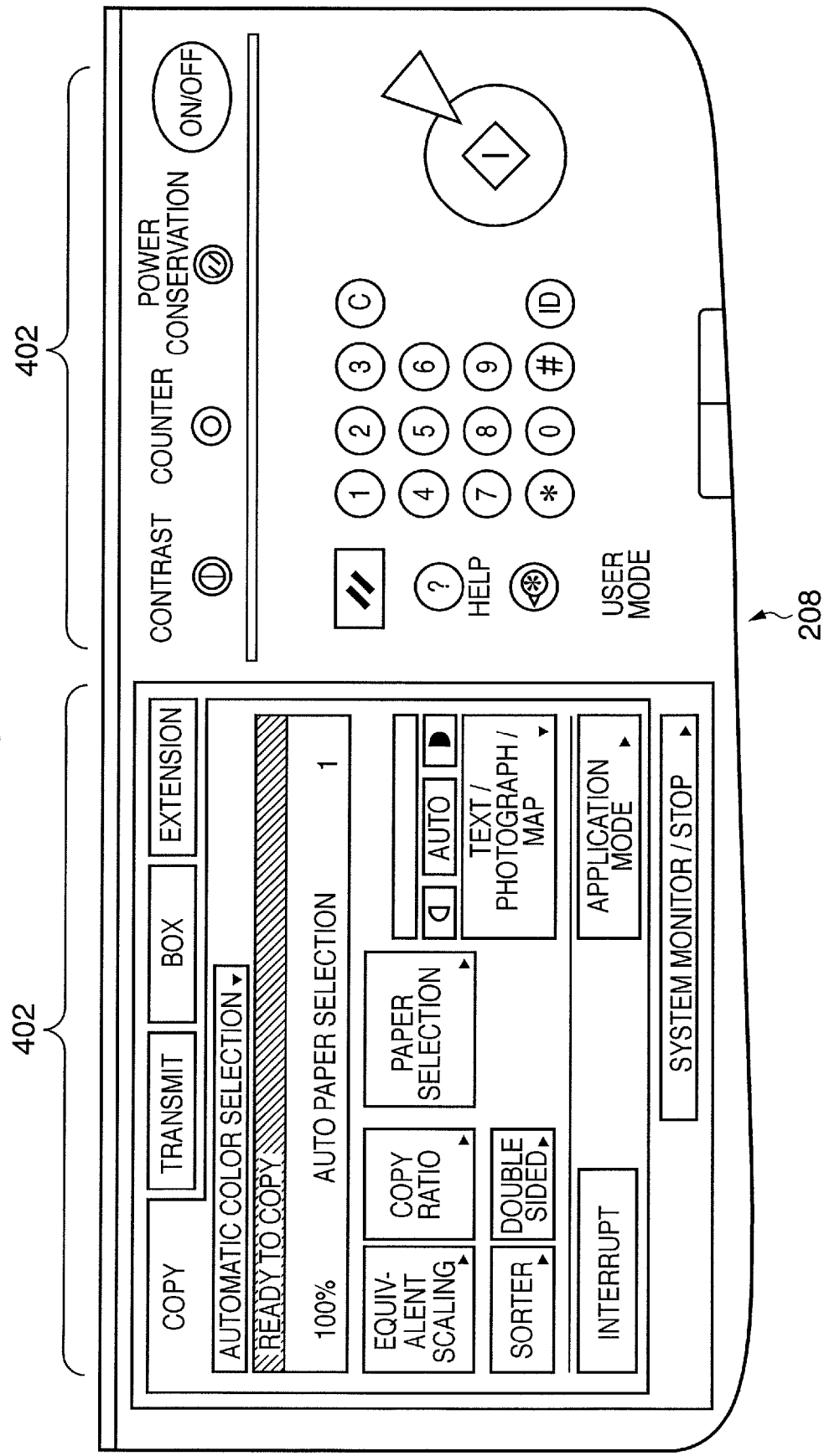
FIG. 4 depicts an external view for describing an MFP console unit according to the embodiment.

FIG. 4 depicts an external view for describing the console unit 208 of the MFP 301, according to the embodiment.

The console unit 208 possesses a touch panel section 401 and an input key section 402. A detail of each respective section is depicted in FIG. 5 and FIG. 6, with a detailed description thereof to follow.

Figure 5:
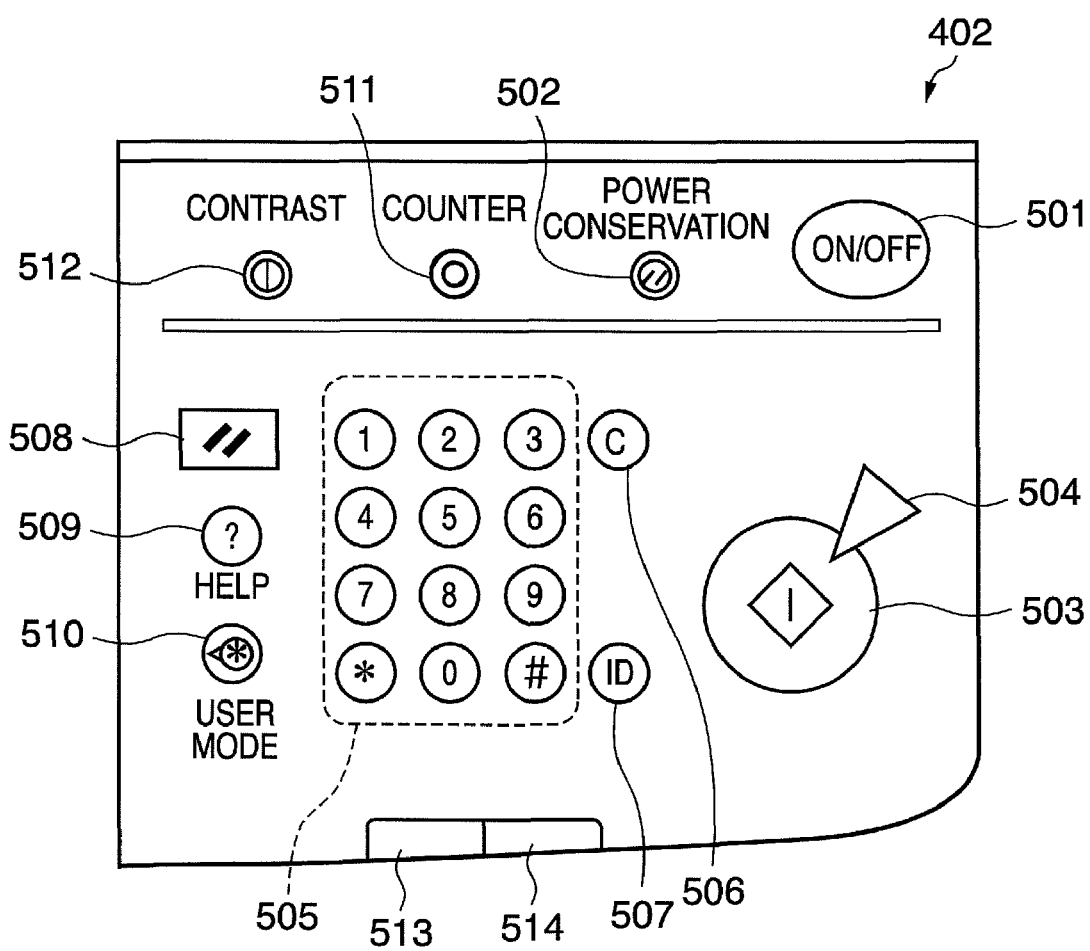
FIG. 5 depicts a view illustrating an input key section of the MFP console unit according to the embodiment.

FIG. 5 depicts an external view that describes the input key section 402 of the console unit 208 of the MFP 301, according to the embodiment.

A power switch 501 switches between a standby mode, i.e., a normal runtime status, and a sleep mode, i.e., a status wherein power consumption is reduced by a main controller stopping an execution of a program in an interrupt-standby mode, in preparation for what may include a network print or a fax operation. The switch 501 controls a power supply when a main power switch (not shown) that performs a power supply is switched on. A power conservation key 502 sets a power conservation mode that lowers a temperature of a fixing unit (not shown) and reduces power consumption. The power conservation mode is also capable of lowering a standby temperature of the fixing unit by setting a power saving efficiency. A start key 503 directs a commencement of a function of copying or transmission of a fax, and a stop key 504 interrupts the copying or transmission process. A ten-key 505 performs a number entry for performing each respective setting, and a clear key 506 clears the number entry. An ID key 507 inputs a pre-defined code number to authenticate the operator of the MFP 301. A reset key 508 cancels respective settings, restoring the system to its default status. A help key 509 displays a guidance or help message, and a user mode key 510 calls up a system setting screen that corresponds to each respective operator. A counter key 511 displays a number of outputted sheets of print paper that is stored in a software counter that is installed in the MEFP 301 and that counts the number of sheets of printed paper. It is capable of causing to display a respective number of outputted sheets corresponding to an operating mode, such as a copy, a print, a scan or a fax mode, a color mode such as a color or black-and-white mode, or a paper size, such as large or small. A contrast dial 512 adjusts a screen contrast, such as a brightness of a backlight on a display unit of the touch panel section 401. An execute/memory lamp 513 blinks while a job is being executed or when the memory is being accessed. An error lamp 514 notifies the user by turning on and off of an error, such as not being able to execute a job or needing to make a service call, as well as a circumstance, such as a paper feed jam or a consumable being used up.

Figure 6:
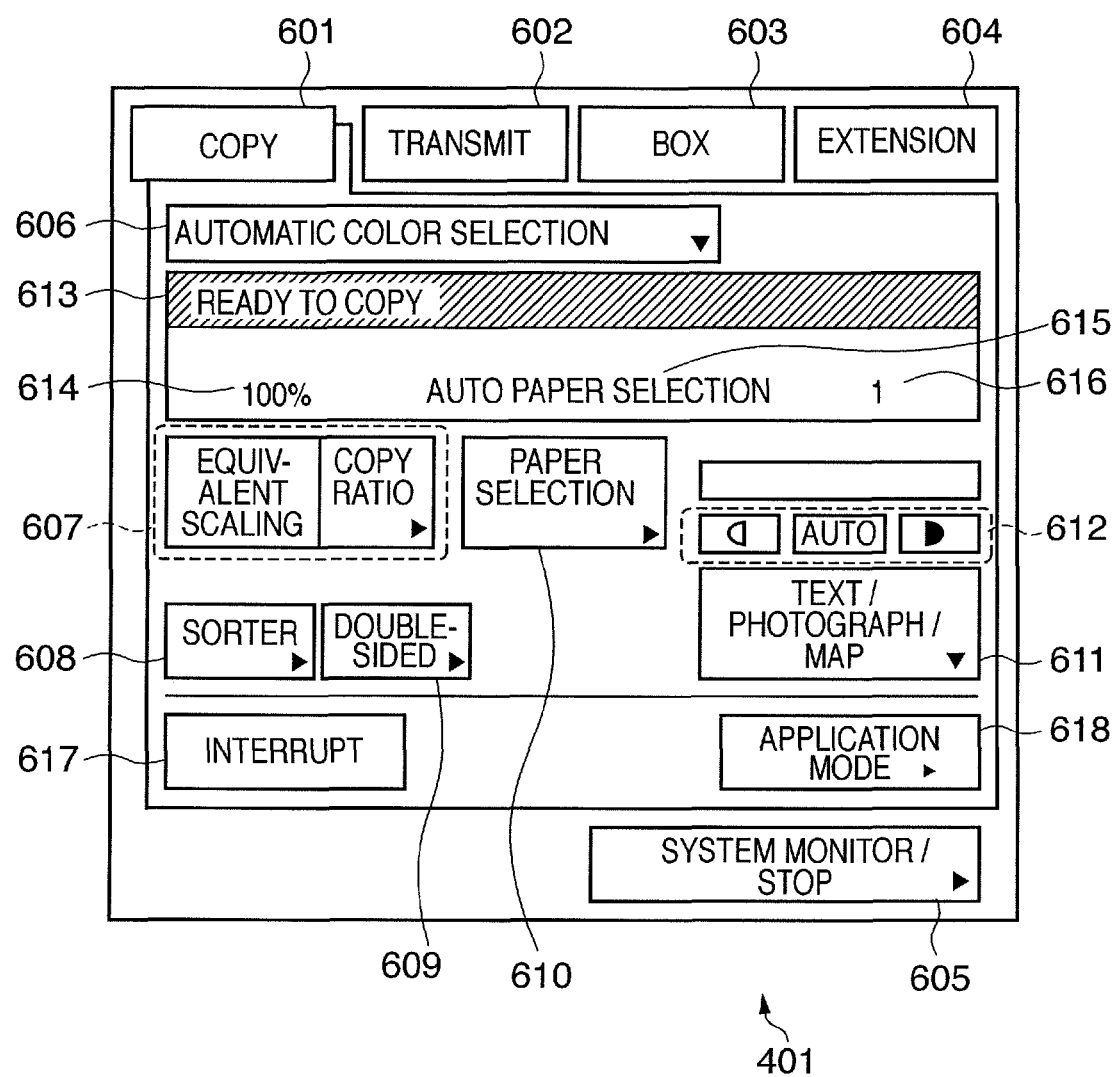
FIG. 6 depicts an external view illustrating a touch panel section of the MFP console unit according to the embodiment.

FIG. 6 depicts an external view illustrating the touch panel section 401 of the console unit 208 of the MFP 301, according to the embodiment. The touch panel section 401 possesses a touch panel that is constituted of an LCD and a transparent electrode that is overlaid thereupon. Touching the transparent electrode portion that corresponds to a key that is displayed on the LCD with a finger is detected, and the system is pre-programmed to either input a value or a set value so instructed, or else to display a different corresponding console screen. The figure depicts an initial screen in the standby mode, with a variety of the console screens being displayed in response to the operator's setting operation.

A copy tab 601 directs a switch to a copy operation screen. A transmission tab 602 switches to an operation screen that directs a transmission function, such as a fax or e-mail transmission. A box tab 603 switches to an operation screen for using a box, i.e., a memory unit that stores a job on a per operator basis. An extension tab 604 is for setting an extension function such as setting of a scanner configuration or other applicable feature. A system monitor key 605 designates to display a condition or a status of the MFP 301. Pressing, i.e., directing, each respective tab allows switching to each respective corresponding operation mode.

A color selection setting key 606 is for pre-selecting a color copy, a black-and-white copy, or an automatic selection. A copy ratio key 607 switches to a screen that performs a scale setting such as a equivalent size as an original, an enlargement, or a reduction. A sorter key 608 switches to a post-processing screen that sets whether or not to use the staples or the hole punch, as well as a quantity and a position thereof. A double-sided setting key 609 switches to a screen that selects a single-sided or double-sided print. A paper size setting key 610 switches to a screen that selects a paper feed tray, a print paper size, and a media type. An image mode setting key 611 selects an image mode that is optimized for the original image, such as a text mode or a photographic mode. A density setting key 612 adjusts the output image to be darker or lighter than the original.

A status display unit 613 performs a simplified status display, such as the standby status, a warm-up, the paper feed jam, or the error. In the figure, a "Ready to Copy" message is displayed, signifying that the system is in standby status of the copy mode. A scale display unit 614 displays the scale that is set using the copy ratio key 607. In the figure, a "100%" message is displayed, signifying that the system is set for the same scale as the original. A print paper size display unit 615 displays the print paper size and mode that are set with the paper size setting key 610. In the figure, an automatic paper selection is selected, which automatically decides a paper size of sheet to be printed in accordance with the paper size of the original. A number of copies display unit 616 displays the number of copies to be copied or otherwise produced, as specified with the ten-key pad, as well as which copy is currently being printed, during runtime. An interrupt key 617 is used when interrupting a copy job in progress to run another job. An application mode key 618 switches to a screen that performs setting of an image process or a layout, such as a consecutive page print, a cover or insert paper setting, a page reduction layout, or an image shift.

Figure 7:
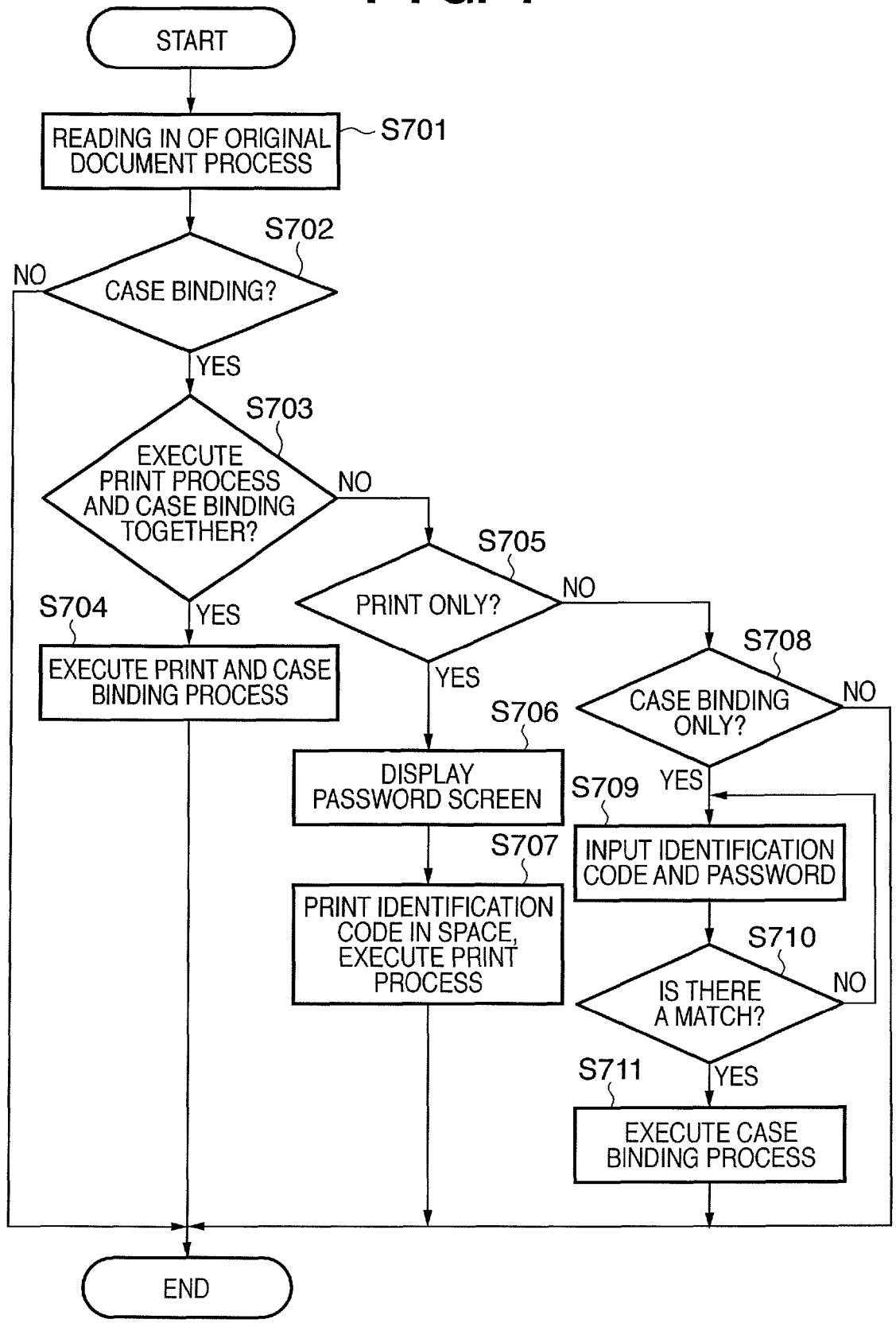
FIG. 7 is a flowchart describing a control sequence of a case binding of a copy job pertaining to the MFP, according to a first embodiment.

FIG. 7 is a flowchart describing a control sequence of a case binding of a copy job pertaining to the MFP 301, according to the first embodiment. A process is executed under the control of the CPU of the MFP control unit 203, and a program that controls the process is stored in a memory (not shown) of the MFP control unit 203.

Figure 8:
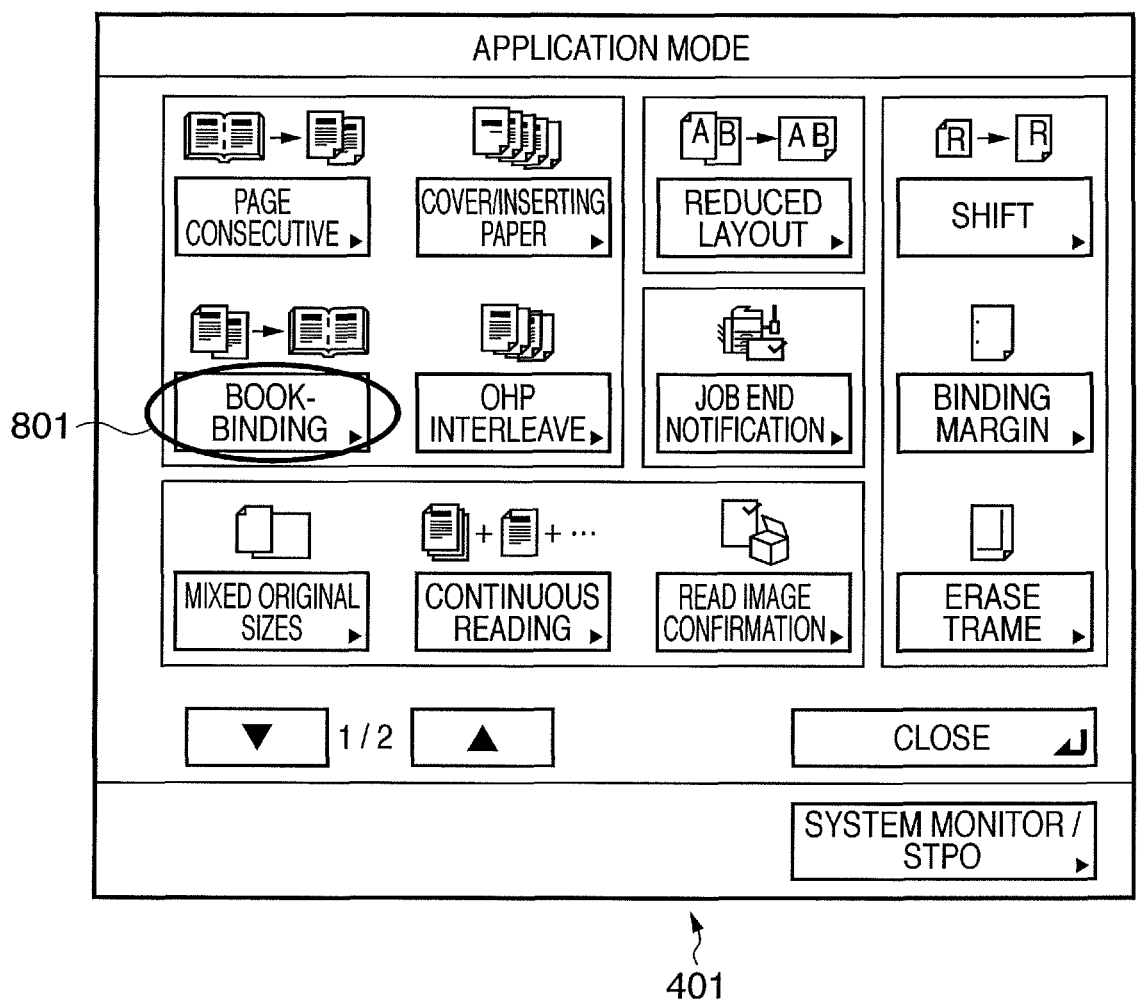
FIG. 8 depicts a view illustrating a display example of an application mode selection screen that is displayed in the touch panel section of the MFP console unit, according to the first embodiment.

The process commences with the screen that is depicted in FIG. 6 being in the state that is displayed in the touch panel section 401, wherein the operator places the original in an original tray of the MFP 301, presses the application mode 618 of the touch panel section 401, and causes an application mode settings screen 801 to be displayed, such as is depicted in FIG. 8, per step S701.

FIG. 8 depicts a view illustrating a display example of the application mode selection screen that is displayed in the touch panel section 401 of the console unit 208 of the MFP 301, according to the first embodiment of the present invention.

Figure 9:
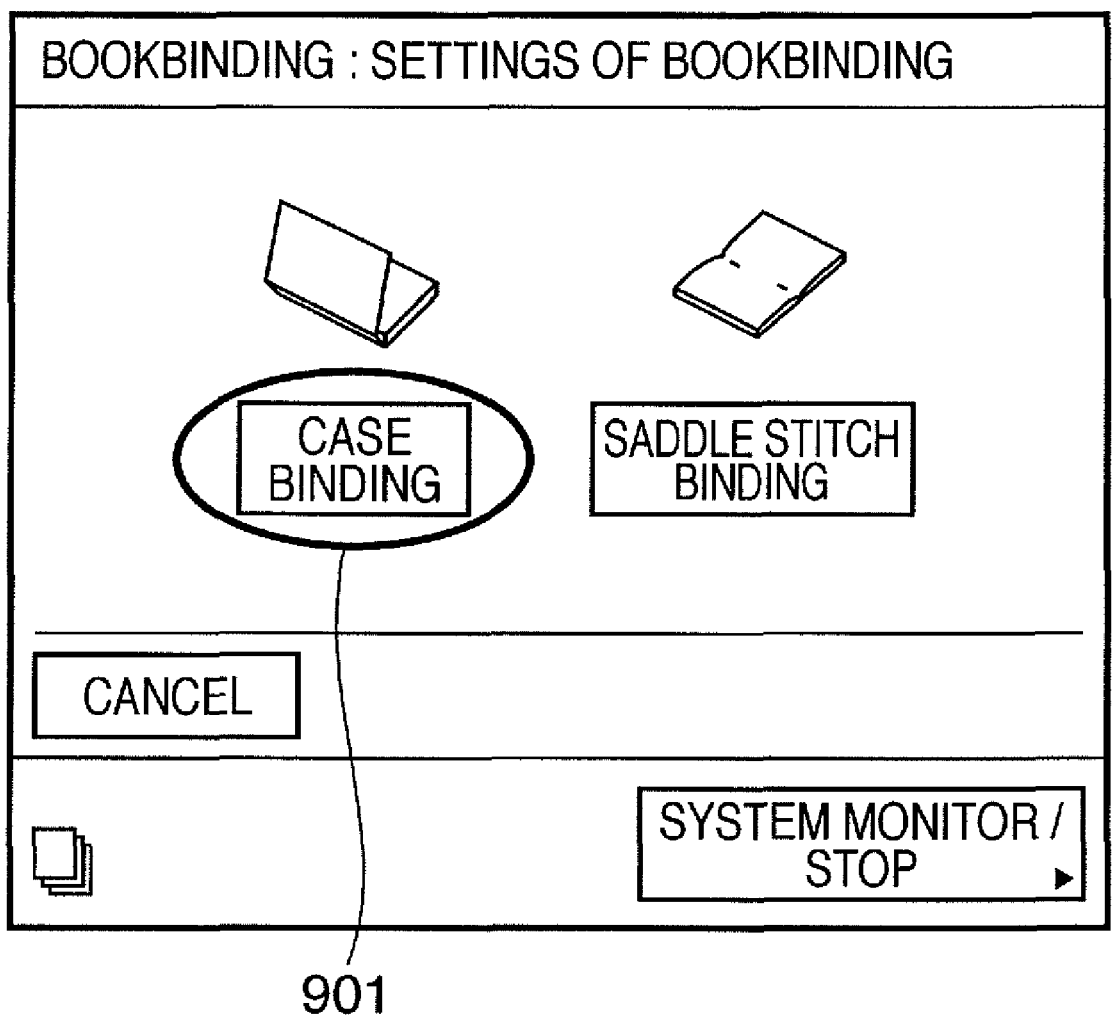
FIG. 9 depicts a view illustrating a display example of a setting screen for the bookbinding settings that is displayed in the touch panel section when a bookbinding button is pressed in the situation in FIG. 8.

FIG. 9 depicts a view illustrating a display example of a setting screen for a bookbinding settings that is displayed in the touch panel section 401 when a bookbinding button 801 is pressed in the situation in FIG. 8.

Figure 10:
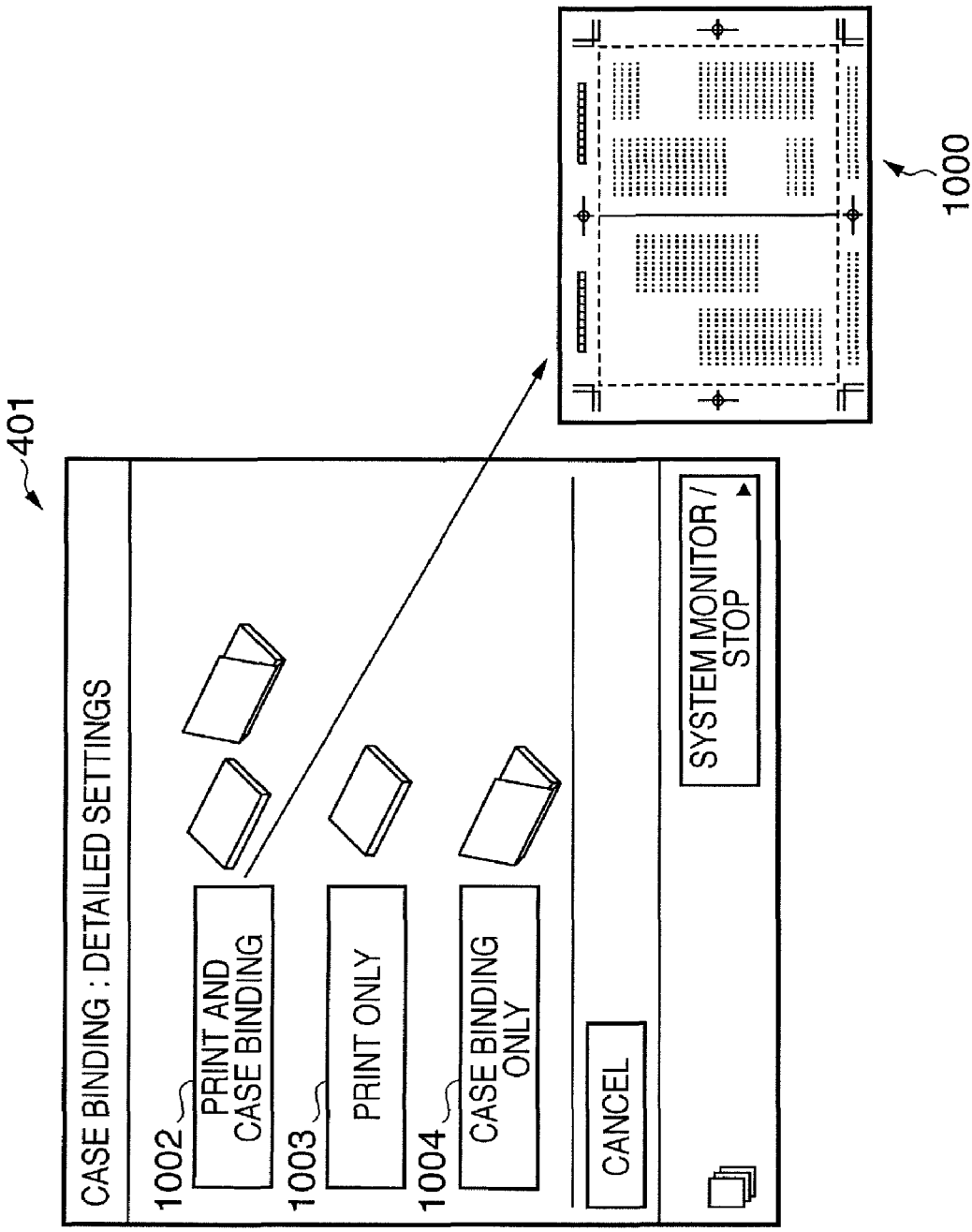
FIG. 10 depicts a view illustrating a display example of a setting screen for case binding detail settings, according to the first embodiment.

In the situation in FIG. 9, it is determined in step S702 whether or not the case binding is instructed. If the operator has designated a case binding button 901, the process proceeds to step S703, wherein a screen such as the screen depicted in FIG. 10 is displayed. In order to describe a process for the case binding, the process shown in FIG. 7 terminates if the case binding is not instructed in step S702.

FIG. 10 depicts a view illustrating a display example of a setting screen for the case binding detail settings, according to the first embodiment.

In step S703, it is determined whether or not the system has been instructed to process a printing of texts (documents to be case bound) and the case binding together. If it is determined that the operator designates to implement the processes together, by depressing a print and case binding button 1002, as depicted in FIG. 10, is instructed. In such a circumstance, the process proceeds from step S703 to step S704, wherein the case binding process is executed following the print process, and the process terminates. In such a circumstance, the printer unit 206 of the MFP 301 executes the print process of the documents. The printed papers are then directly fed to a case binding port (not shown) within the case binding unit 303. The case binding unit then executes a case binding process on the printed papers for the job. It is thus possible to perform the print process on papers and the case binding process on the printed papers. In FIG. 10, numeral 1000 denotes an example of a printed paper in the print and case binding process mode. In such a circumstance, a resulting print form takes into account a saddle stitch for a bookbinding.

If, on the other hand, it is determined that the print and case binding button 1002 is not directed in step S703, the process proceeds to step S705, wherein it is determined whether or not the print only has been instructed. That is, it is determined in step S705 whether or not a print only button 1003 in FIG. 10 has been pressed. If the print only button 1003 has been pressed, the process proceeds to step S706, wherein a screen such as is depicted in FIG. 11A is displayed.

Figure 11A:
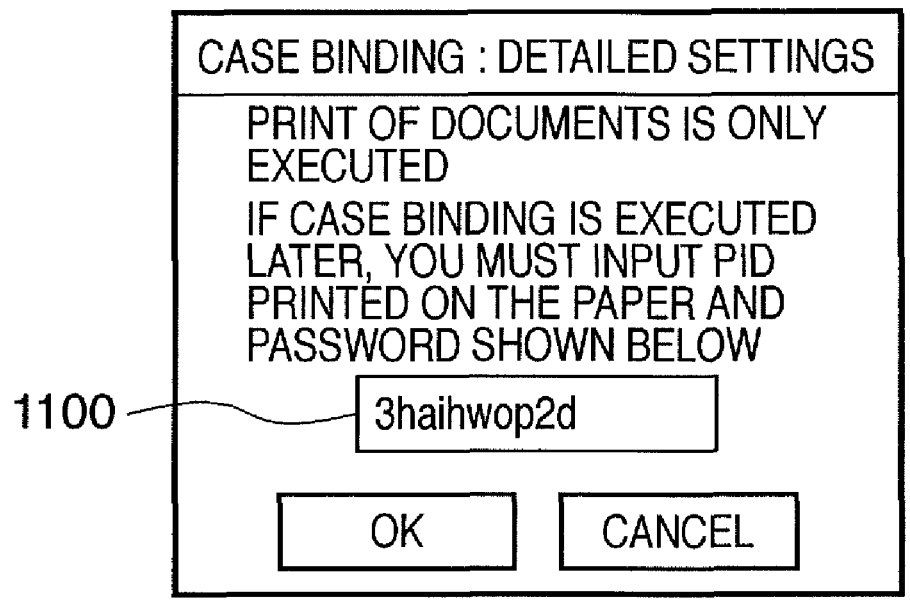
FIG. 11A depicts a view illustrating a display example of the case binding setting screen when an instruction is given only to print documents.
Figure 11B:
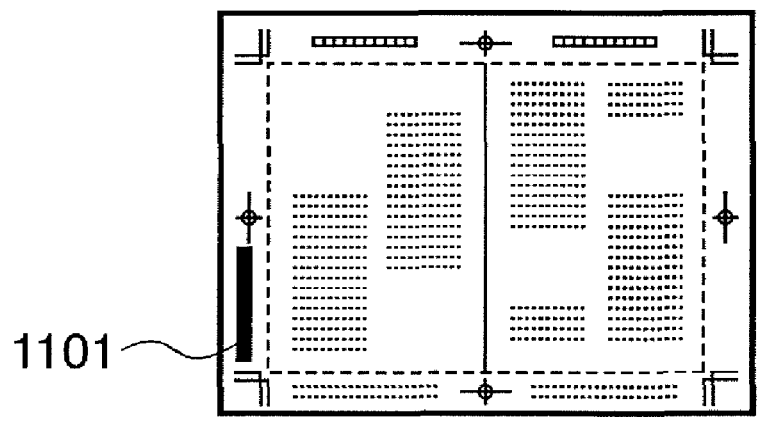
FIG. 11B depicts an example of printed sheet.

FIG. 11A depicts a view illustrating a display example of the case binding setting screen when an instruction is given only to print. FIG. 11B depicts an example of a printed sheet.

FIG. 11A depicts an input screen for a password for a case binding after the printing of documents. Numeral 1100 denotes a password input area. When the password is entered and an OK button is designated in the screen, the process proceeds to step S707, wherein a printing of the read-out originals is performed by the printing unit 206. FIG. 11B depicts an example of a printed paper in step S707. A Print Identification Data (PID) code 1101 is printed by the printing unit 206 in a space area of the printed paper. The process then terminates. The PID code may be a bar code, and includes a PDI code of a job that have printed the paper, an ID of a machine that have printed the paper, or a print condition. In such a circumstance, the MFP 301 links and stores the password that is inputted using the screen depicted in FIG. 11A to the job PID code that is printed upon the paper.

When using the case binding unit 303 for the case binding of the printed papers, the operator inputs the password, "3haihwop2d," that was inputted in FIG. 11A, together with the PID code that was printed on the paper, and instructs the case binding unit 303 to execute the case binding process of the papers. It is thus possible to link the bookbinding process to the printed papers that are the object of the bookbinding.

If, on the other hand, the print only button 1003 has not been pressed in step S705, the process proceeds to step S708, wherein it is determined whether or not a case binding only button 1004 has been instructed. That is, it is determined whether or not the case binding has been instructed. If so, the process proceeds from step S708 to step S709, wherein a detail setting screen as depicted in FIG. 12 is displayed on the touch panel section 401. If the case binding only button 1004 has been instructed, it is presumed that the printed papers are placed in the case binding unit 303, and the PID code that is printed upon the printed paper is readable.

FIG. 12 depicts a view illustrating an example of the case binding detail setting screen that is displayed in the touch panel section 401 of the MFP console unit 301, according to the first embodiment.

An input for a code and a password is requested herein that are the same as the PID code that was printed in the space area shown in FIG. 11B and the password that was inputted into the password screen shown in FIG. 11A as being displayed when executing step S707. FIG. 12 depicts a status wherein the matching PID code and password have been inputted, according to the embodiment. When the operator inputs the password, "3haihwop2d," and the PID code of the job, "02345," the process proceeds to step S710, wherein the inputted password and PID code are compared with the PID code printed on the printed paper and the password stored in corresponding to the job code, and it is determined whether or not the respective passwords and PID codes match. If the comparison in step S710 determines that a match exists, the process proceeds to step S711, wherein the case binding unit 303 executes the case binding process of the printed papers that are placed in the case binding unit 303, and the process terminates. If, on the other hand, it is determined in step S710 that a match does not exist, the process returns to step S709, wherein once again the operator is prompted to input the password and the PID code, and the preceding process is executed.

Thus, according to the first embodiment, it is possible to select whether to perform the print process and the case binding process in series, or to execute only the printing process of documents and perform the bookbinding at a later time, using the printed papers, and execute accordingly. If the print process and the case binding process are not executed together, it is also possible to perform with ease a linkage between the printed papers and the bookbinding process, allowing a prevention of a mistaken operation of performing the bookbinding process using wrong printed papers.

Thus, it is possible for even an inexperienced operator to perform a bookbinding properly.

The Second Embodiment

The second embodiment describes a circumstance wherein the operator may instruct the printed papers slated for a bookbinding to be reprinted, in a case where a paper jam occurs during the case binding only operation. It is presumed that the constitution of the system, the MFP, and other apparatus according to the second embodiment is similar to that according to the first embodiment.

Figure 13:
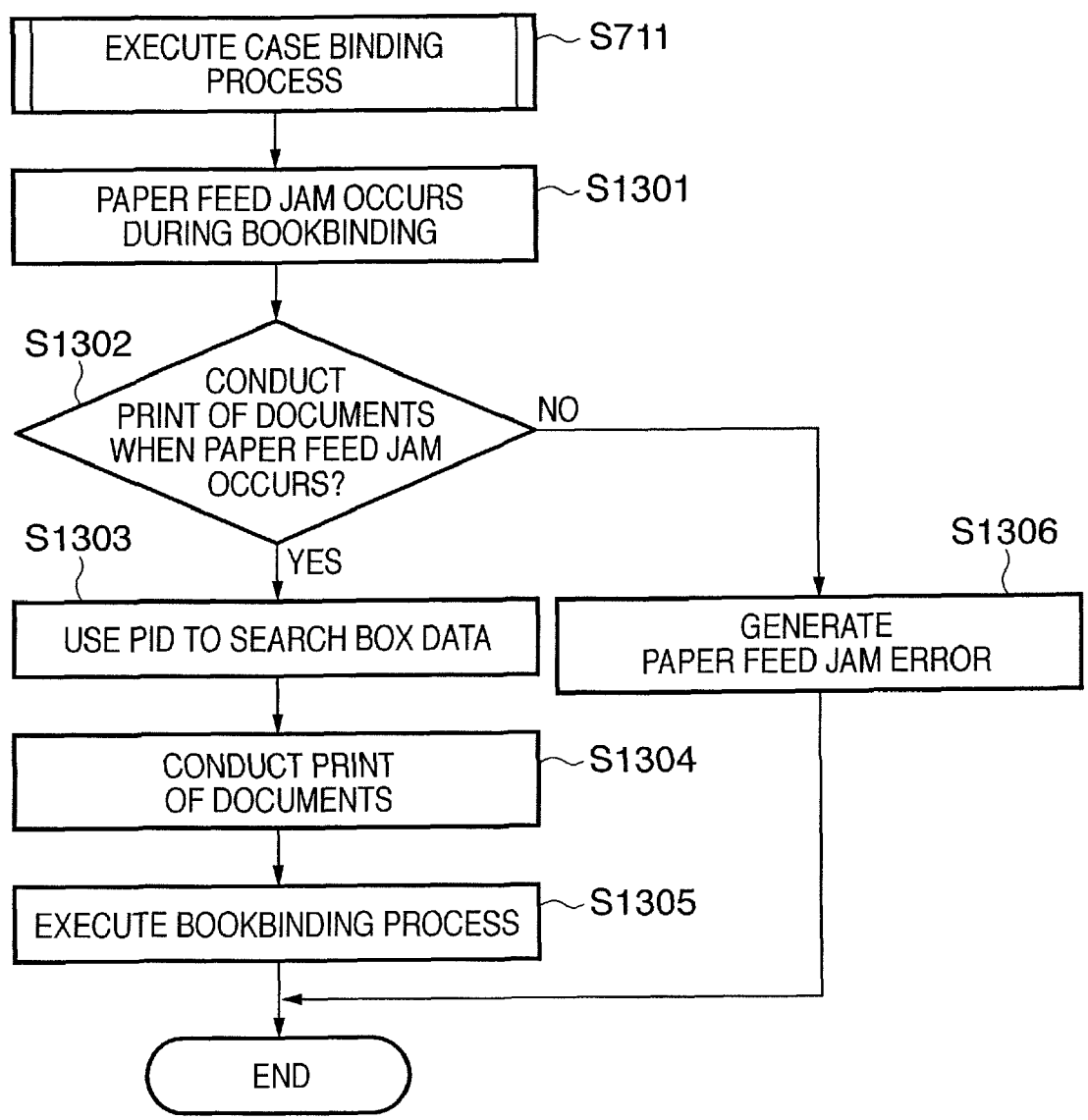
FIG. 13 is a flowchart describing a sequence of reprinting papers targeted for bookbinding, in a case where a jam occurs with the case binding pertaining to the MFP, according to a second embodiment of the present invention.

FIG. 13 is a flowchart describing a sequence of reprinting the printed papers targeted for bookbinding when a jam occurs with the case binding pertaining to the MFP 301, according to the second embodiment of the present invention. A process of FIG. 13 is executed in the case binding process in the process in FIG. 7, step S711. The description of the process from step S701 through step S710 is the same process as that in the first embodiment, and thus, is omitted herein.

If a paper feed jam occurs during the bookbinding process by the case binding unit 303 in step S1301, then the process proceeds to step S1302, wherein it is determined whether or not a configuration is set to automatically carry out print process if the paper feed jam occurs.

Figure 14:
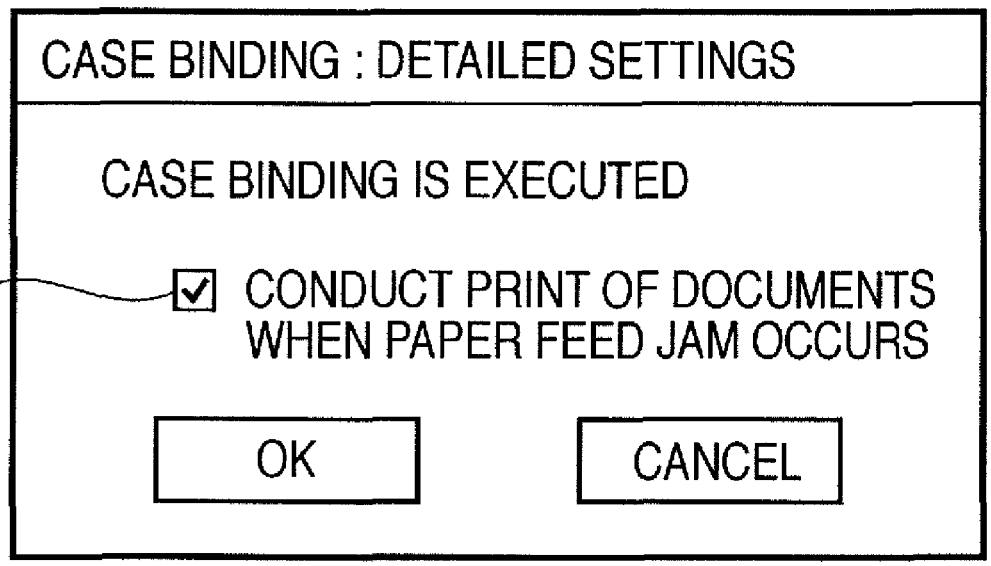
FIG. 14 depicts a view illustrating an example of a setting screen for the case binding detail settings according to the second embodiment.

FIG. 14 depicts a view illustrating an example of a detail setting screen for the case binding according to the second embodiment.

In a case that a checkbox 1401 for designating to carry out the print process of the documents when the paper feed jam occurs is set in the screen, the print process of the papers targeted for the bookbinding is carried out.

If the checkbox 1401 in FIG. 14 is checked in step S1302, i.e., setting carrying out the print process of the documents when the paper feed jam occurs, the process proceeds to step S1303, whereas the process proceeds to step S1306 if the checkbox 1401 in FIG. 14 is not checked, a jam error process is executed, and the process is suspended and terminates as a regular error.

In step S1303, box data of the MFP 301 that stores the document data is searched, using the PID code that is input in the screen in FIG. 12. The process then proceeds to step S1304, and the print process is executed according to the document data stored in the box. Once the print process has been completed by the MFP 301, the case binding process is continued by the case binding unit 303 in step S1305, and the process terminates. The processes in step S1304 and step S1305 are the same as the print process and the bookbinding processes, as per FIG. 7, step S704, when the print and case binding button 1002 is selected in FIG. 10.

According to the second embodiment, it is possible to automatically have the printer unit 203 re-execute the print process of papers targeted for bookbinding if it jams in the paper feed during the bookbinding process, and thus obtain the printed papers for bookbinding, in accordance with an identification information that is issued prior to the bookbinding process.

While the second embodiment describes a paper feed jam of the printed paper during the bookbinding process, it is also permissible to execute the above mentioned recovery process when an error occurs such as the printed paper being damaged.

It is also permissible to print only the damaged page of the printed paper in the error recovery. It would also be permissible to link the document data to each respective page when storing the document data, and specifying the page that is damaged by the jam, and printing only the paper of the damaged page in step S1304.

Third Embodiment

The third embodiment describes a circumstance of loading a print job from the client PC 102 to the MFP system 100 and carrying out a control of the case binding. It is presumed that the constitution of the system, the MFP, and other apparatus according to the third embodiment are similar to those according to the first embodiment. A process that is the same as the process in the first embodiment and the second embodiment is designated in a figure with a similar reference number, and an overview description is omitted.

A printer driver is used as a device for outputting a proof, or for outputting a finished product, from a printing application to a print device, such as the MFP 301.

FIG. 15 depicts a view illustrating an example of a printer driver setting screen according to the third embodiment of the present invention. The screen is typically displayed by selecting a print menu of the printing application when the operator prints the print data to the print device, such as the MFP 301.

The operator selects a printer to use from a printer name pulldown menu 1501 of the setting screen. In the present circumstance, the MFP 301 is selected as the print device. A status 1502 therebelow displays a status of the selected printer, i.e., the MFP 301. A type 1503 displays a type of the printer driver. A location 1504 displays a location of the printer, i.e., the MFP 301. A comment 1505 displays a comment from an administrator of the printer, i.e., the MFP 301. If it is desired to output the print data as a file to the MFP box without having the printer, i.e., the MFP 301, print the print data, an output to file checkbox 1506 will be checked to signify that an output to file option has been selected.

A print range 1507 specifies a desired print range as all, a current page, a selected page, or a designated page, by clicking a radio button that corresponds to a respective option. If the designated page is selected, the operator will input a number of a page for which printing is desired in an input field 1508.

A property of the document to be printed is selected in a document to be printed pulldown menu 1509. Whether to print all pages or only odd-numbered or an even-numbered pages is specified in a print specification pulldown menu 1510.

A number of copies is input in a copies selection field of a number of copies 1511. A circumstance of printing a plurality of copies on a per copy unit basis, rather than a per page unit basis, is selected by checking a print on a per copy unit basis checkbox 1513.

It is possible to specify an N-up printing, i.e., a layout of a plurality of pages on a single sheet of print paper, with a number of pages per sheet pulldown menu 1514 in an magnification/reduction area. A print paper size vis-à-vis a size of an original is selected from a specify sheet size pulldown menu 1515.

Instructing a property button 1516 allows setting a more detailed print property. If the operator is thus finished with setting the printer driver setting screen, instructing an OK button 1517 allows printing the print data to the printer device, such as the MFP 301, or outputting the print data to the box file. Instructing a cancel button 1518 undoes the settings.

Figure 16:
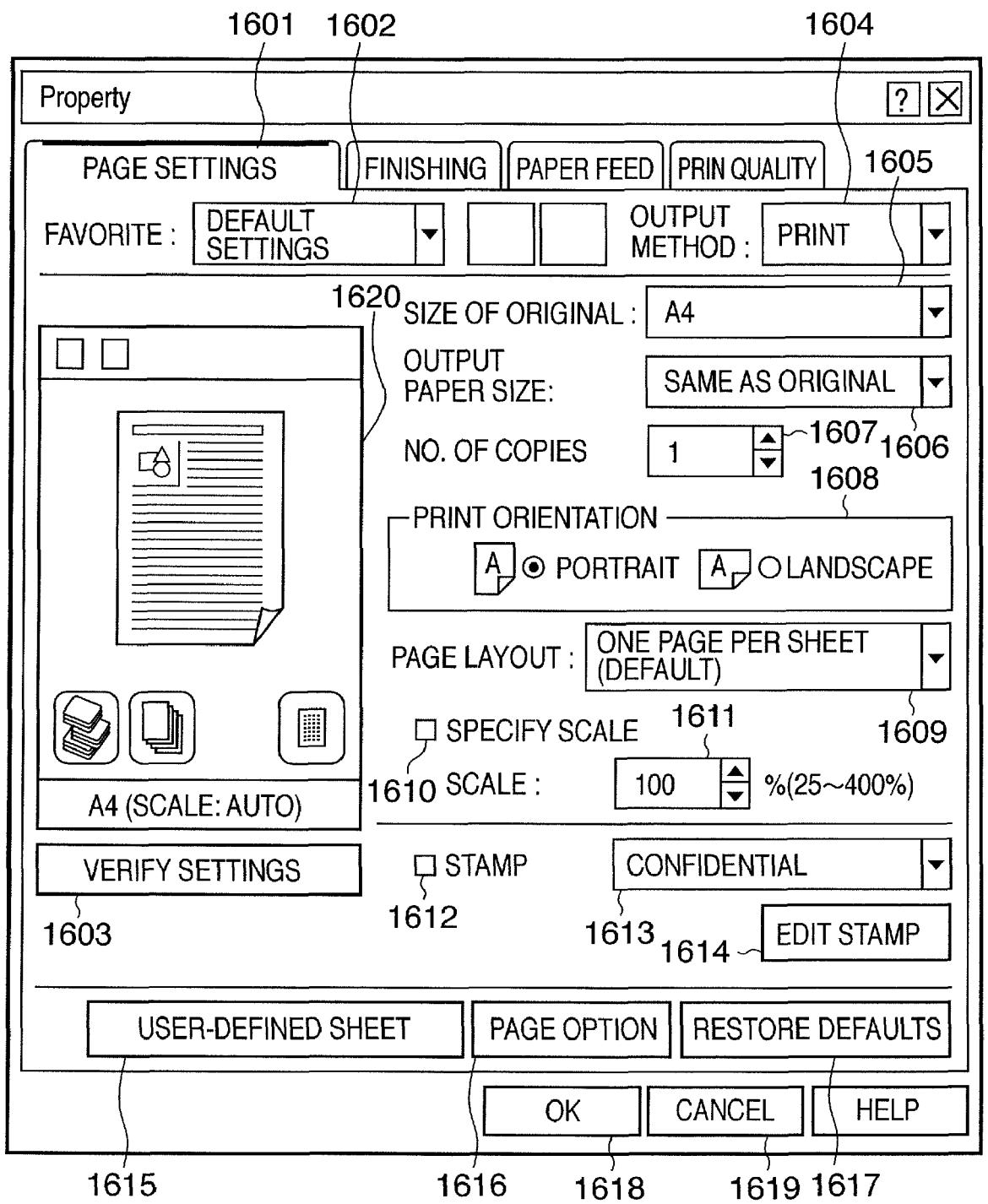
FIG. 16 depicts an example of a screen that is displayed either as a default, in a case that a property button is instructed in the screen depicted in FIG. 15, or in a case that a page setting tab of a printer driver property setting screen is selected.

FIG. 16 depicts a view illustrating an example of a screen that is displayed either as a default when the property button 1516 is instructed in the screen depicted in FIG. 15, or when a page setting tab 1601 of the printer driver property setting screen is selected.

An optimal page setting is selected from a predefined page setting mode in a favorite pulldown menu 1602. In the present circumstance, default settings are selected. Instructing a verify setting button 1603 allows displaying a list of settings that have been set in the property setting screen. The settings that have been set in the property setting screen are reflected in a page image that is displayed above the verify setting button 1603, in a field 1620.

An output method pulldown menu 1604 specifies an output method, i.e., whether to print or to secure print via the printer, such as the MFP, to save to a hard drive of the printer, or to execute and edit and preview in the printer. A regular print is selected in FIG. 16. A size of an original to be printed and a size of a sheet to be printed in the printer, i.e., the MFP 301, are respectively selected in a size of original pulldown menu 1605 and an output print paper size pulldown menu 1606. In the example, the size of the original is set to be A4, and the size of the output print paper is set to be the same size as the original. A number of copies to be printed is inputted in a number of copies selection box 1607. A print orientation radio button 1608 selects a portrait or a landscape orientation. In the figure, one copy is selected, with a portrait print orientation.

A page layout pulldown menu 1609 allows specifying an n-up print, i.e., a layout of a plurality of pages on a single sheet of print paper. A regular one page per sheet is set in the example. If a specify scale checkbox 1610 is checked, a scale of magnification or reduction is inputted as a percentage in a scale selection box 1611. If a stamp checkbox 1612 is checked, a predefined stamp type is selected in a pulldown menu 1613. Instructing a stamp edit button 1614 allows adding or editing the stamp type.

Instructing a user-defined sheet button 1615 allows defining the user-defined sheet to be printed. Instructing a page option button 1616 allows setting a more detailed page option. Instructing a restore default button 1615 allows restoring the settings to the default. If the operator is finished with settings using the printer driver property setting screen, instructing an OK button 1618 allows reflecting the print property in an actual print. Instructing a cancel button 1619 cancels the settings using the screen. A help button displays a help screen of the property setting screen.

Figure 17:
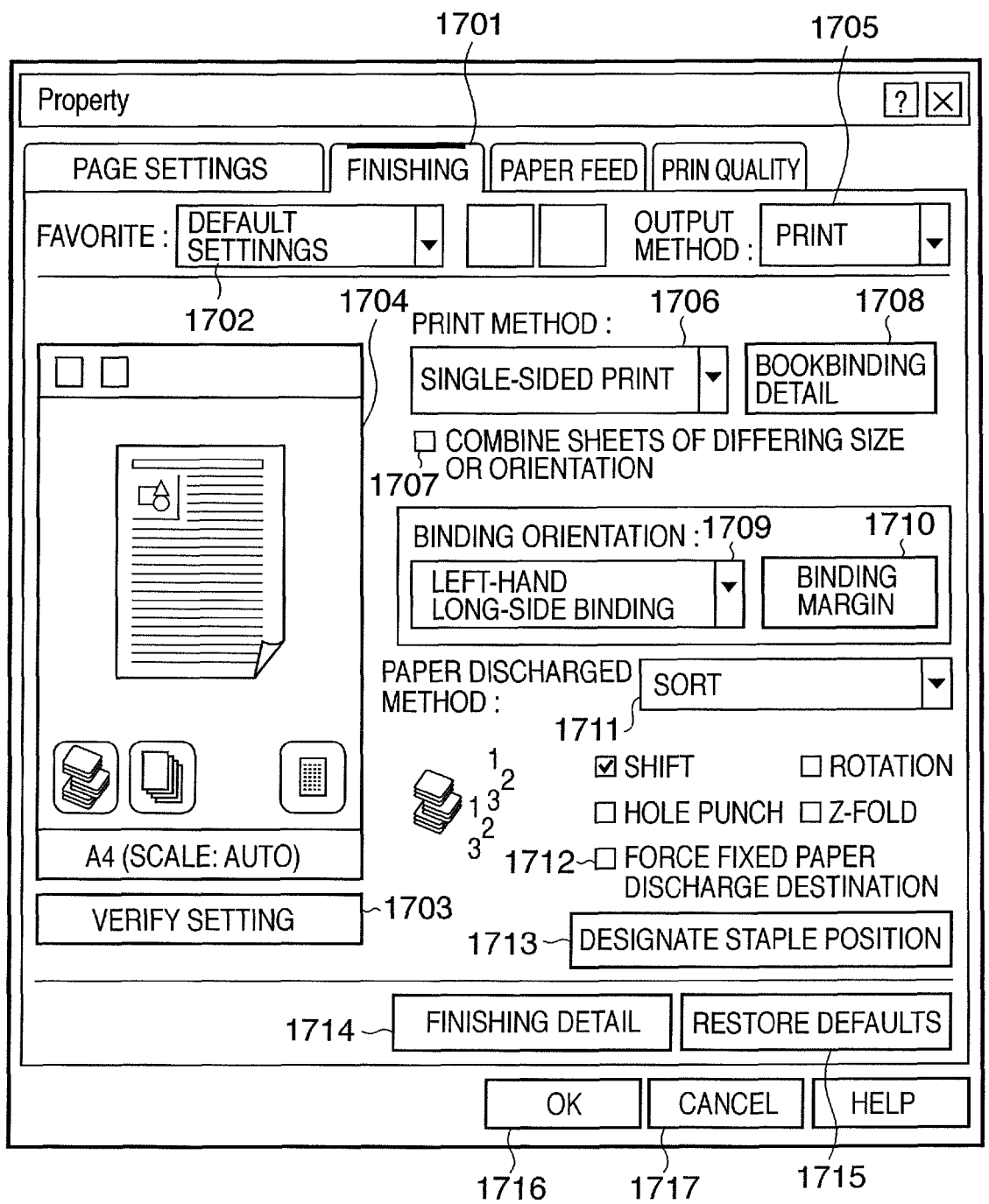
FIG. 17 depicts an example of a screen that is displayed, in a case that a finishing tab of the printer driver property setting screen is selected.

FIG. 17 depicts an example of a screen that is displayed when the property button 1516 of the screen depicted in FIG. 15 is instructed, and a finishing tab 1701 of the printer driver property setting screen is selected.

An optimal page setting is selected from a predefined page setting mode in a favorite pulldown menu 1702. In the example given in the figure, the default settings are selected. Instructing a verify setting button 1703 allows displaying a list of settings that have been set in the property setting screen. The settings that have been set in the property setting screen are reflected in a page image that is displayed above the verify setting button 1703, in a field 1704. An output method pulldown menu 1705 selects a method for outputting to the printer, such as the MFP. The print method includes an instruction as to whether to print normally, to secure print, to save to a hard disk of the printer, or to execute and edit and preview in the printer. A regular print is selected in the example given in the figure. A print method pulldown menu 1706 selects a printing method any one of a single-sided printing, a double-sided printing, or a bookbinding printing. The single-sided printing is selected in the example given in the figure. When combining the sheets of differing size or orientation, a combine sheets of differing size or orientation checkbox 1707 is checked, making its state that of being selected, and a specification is thus made of how the sheets are to be combined or arranged, as well as a saddle stitch margin, for example. When selecting a bookbinding printing in the print method pulldown menu 1706, a bookbinding detail button 1708 is instructed, and the bookbinding printing method, a page opening direction, and a saddle stitch margin in the bookbinding are specified. When selecting either a single-sided printing or a double-sided printing in the print method pulldown menu 1706, and the combine sheets of printing paper of differing size or orientation checkbox 1707 is not checked, a selection is made in a binding orientation pulldown menu 1709 of a saddle stitch orientation from among a left-hand long-side binding, a right-hand long-side binding, an upper short-side binding, and a lower short-side binding. A binding margin button 1710 is instructed to designate a saddle stitch binding margin.

A paper discharge method pulldown menu 1711 selects a paper discharge method, from among a sort, a grouping, and a staple. The paper discharge method pulldown menu 1711 specifies a shift, a rotation, a hole punch, or a Z-fold by selecting an associated checkbox. Checking a force fixed paper discharge destination checkbox 1712 to force a fixed paper discharge destination. In the example, sort is set as the discharge method, and shift is set as the finishing method. If staple is selected in the paper discharge method pulldown menu 1711, it is possible to specify a staple position by instructing a staple position designation button 1713.

Instructing a finishing detail button 1714 allows setting the finishing method in more detail. Instructing a restore default button 1715 allows restoring the default value of the respective settings. If the operator is finished with setting the printer driver property setting screen, instructing an OK button 1716 allows reflecting the print property in an actual print. Instructing a cancel button 1717 cancels the settings of the property setting screen. A help button displays a help screen of the property setting screen.

Following is a description of a case binding sequence in a copy job, according to the third embodiment, with reference to FIG. 18 through FIG. 22.

Figure 22:
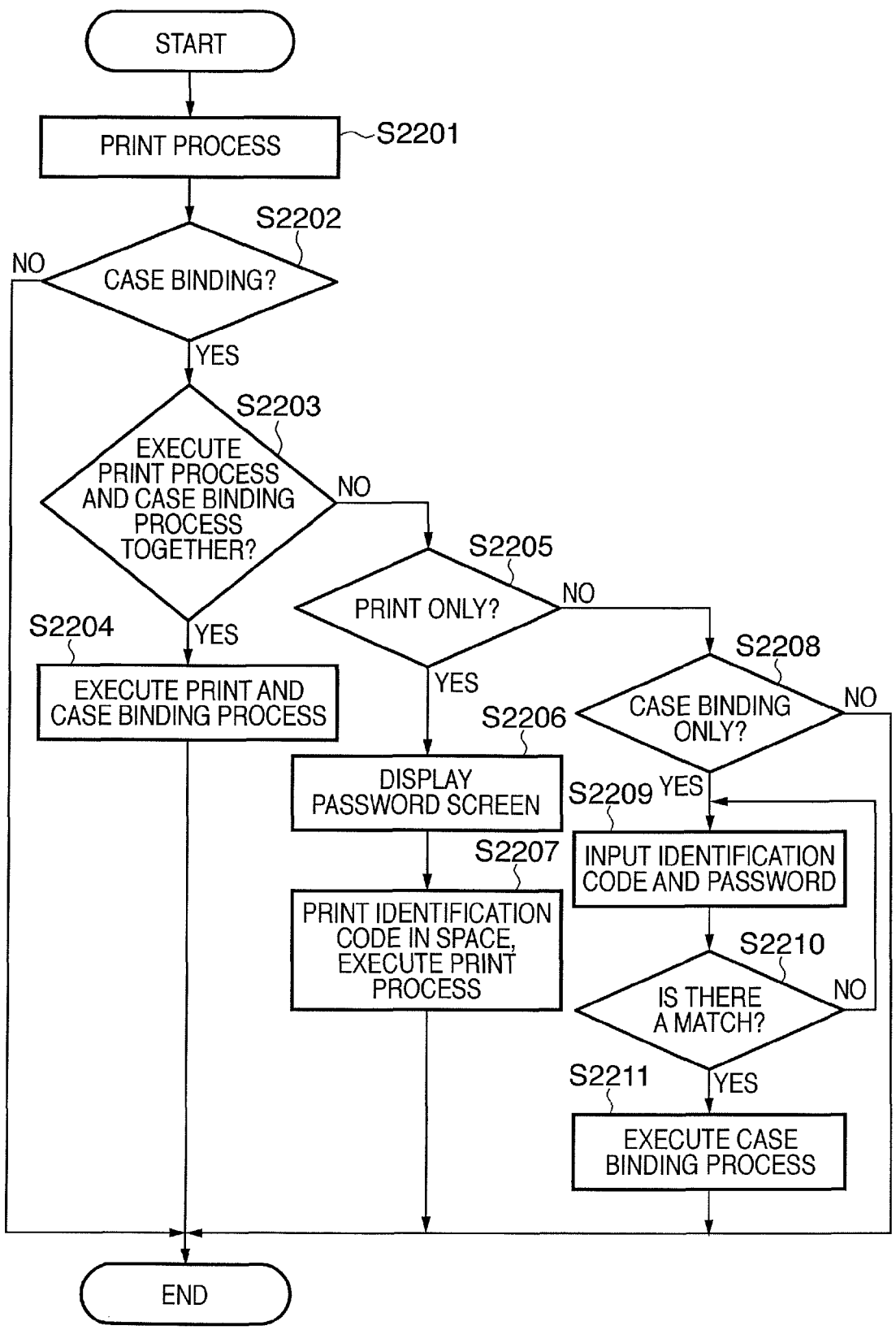
FIG. 22 is a flowchart describing a control sequence of a case binding of a copy job pertaining to the MFP, according to the third embodiment of the present invention.

FIG. 22 is a flowchart describing a control sequence of a case binding of a copy job pertaining to the MFP 301, according to the third embodiment of the present invention. The process is executed under the control of the CPU of the MFP control unit 203, and the program that controls the process is stored in a memory (not shown) of the MFP control unit 203.

Figure 18:
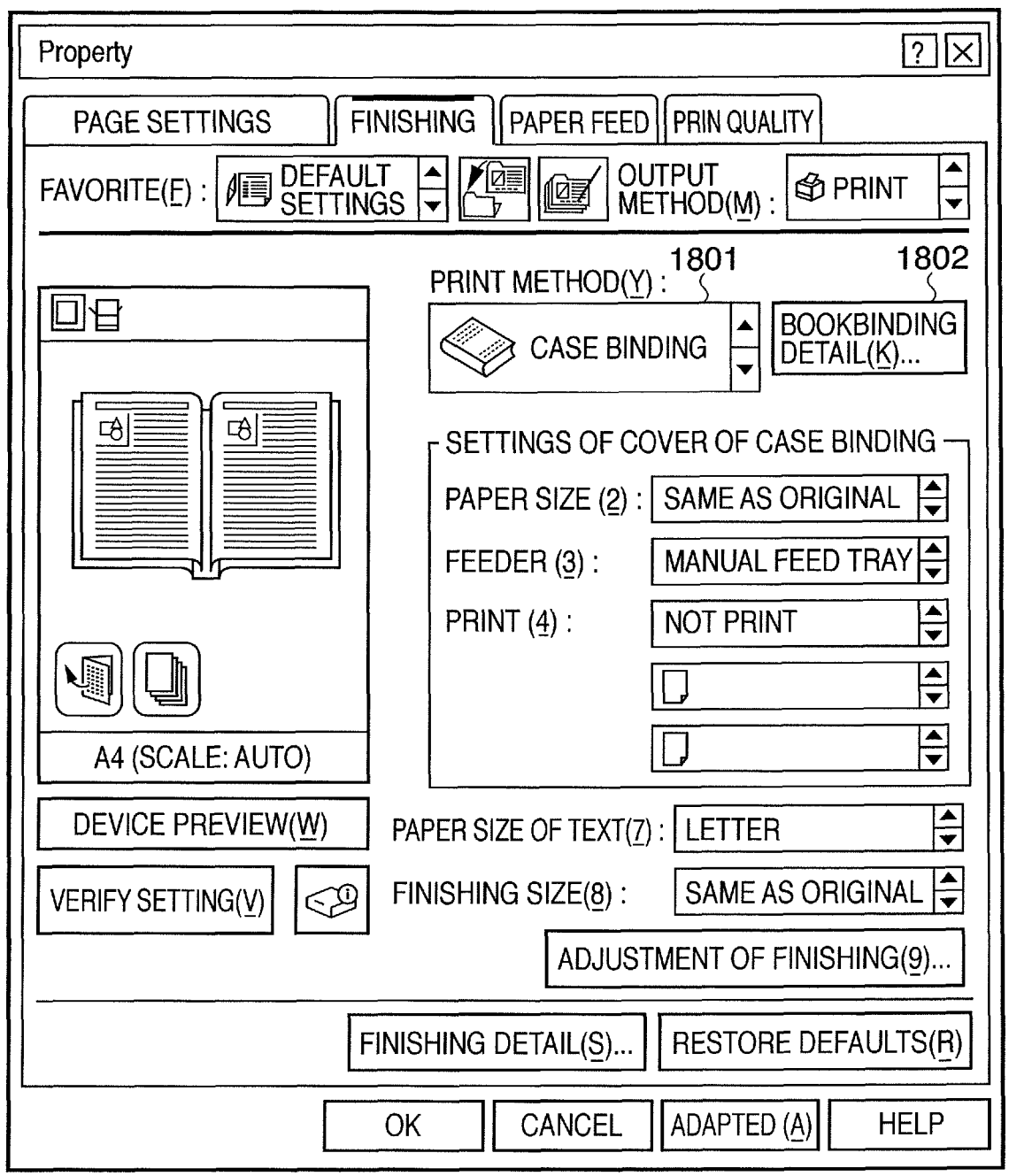
FIG. 18 depicts a view illustrating a display example of the printer driver finishing setting screen.

When a print process is instructed in step S2201, a printer driver finishing setting window is displayed, such as that depicted in FIG. 18.

FIG. 18 depicts a view illustrating a display example of the printer driver finishing setting screen.

Selecting a case binding in a print method pulldown menu 1801 in FIG. 18 causes the process to proceed from step S2202 to step S2203.

FIG. 19 depicts a view illustrating an example of a setting screen of the case binding detail settings that is displayed when a bookbinding detail button 1802 is instructed in the screen depicted in FIG. 18.

In step S2203, it is determined whether or not the operator has used the screen depicted in FIG. 19 to select the print process and the case binding to be processed together. If it is determined in step S2203 that the print and case binding process are implemented, then the process proceeds to step S2204. The selection is made by selecting a print and case binding radio button 1902. When the print and case binding radio button 1902 is selected, the print of documents and the case binding process of the printed documents are executed in step S2204, and the process terminates. The process corresponds to the process described in FIG. 7, step S704.

If, on the other hand, the print and case binding radio button 1902 is not designated in step S2203, the process proceeds to step S2205, wherein it is determined whether or not the only print of documents is selected. The determination is made based on whether or not a print only radio button 1903 is selected in FIG. 19. If the print only radio button 1903 is designated, the process proceeds to step S2206, wherein a password input screen such as that depicted in FIG. 20A is displayed.

Figures 20A, 20B:
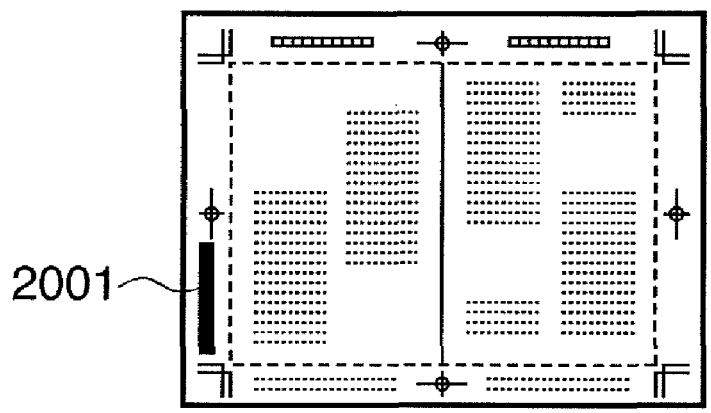
FIG. 20A depicts a view illustrating an example of a password input screen that is displayed in FIG. 22, step S2206.
FIG. 20B depicts a view illustrating the sheet that is printed out.

FIG. 20A describes a view illustrating an example of the password input screen that is displayed in FIG. 22, step S2206, and FIG. 22B depicts a view illustrating a printed sheet in the print process of the documents.

The screen displayed in FIG. 20A displays a screen depicting a password and a print job identification code, or PID. FIG. 20A depicts a status wherein the user has inputted the password, "3haihwop2d," that corresponds to the print job identification code, or PID, "02345". The print job identification code, or PID, and the password are the PID and the password that are required when the case binding of the printed sheets is executed later.

When an OK button FIG. 20A is directed in step S2206, the process proceeds to step S2207, wherein information is printed in a state as printed by the printer unit 203 is printed in a space area 2001 of the printed sheet such as that depicted in FIG. 20B, the information including the identification code that is displayed in FIG. 20A, the MFP 301 hardware ID, and a condition for a printing. The document data thus printed is saved in a box of the MFP 301. The identification code, or PID, and the password that are inputted using the screen depicted in FIG. 20A are linked to one another and stored in the MFP 301.

If, on the other hand, the print only radio button 1903 in FIG. 19 is not designated in step S2205, the process proceeds to step S2208, wherein it is determined whether or not the case binding only radio button 1904 in FIG. 19 is designated. If the case binding only radio button 1904 is designated, the process proceeds to step S2209, wherein a detail setting screen such as shown in FIG. 21 is displayed.

Figure 21:
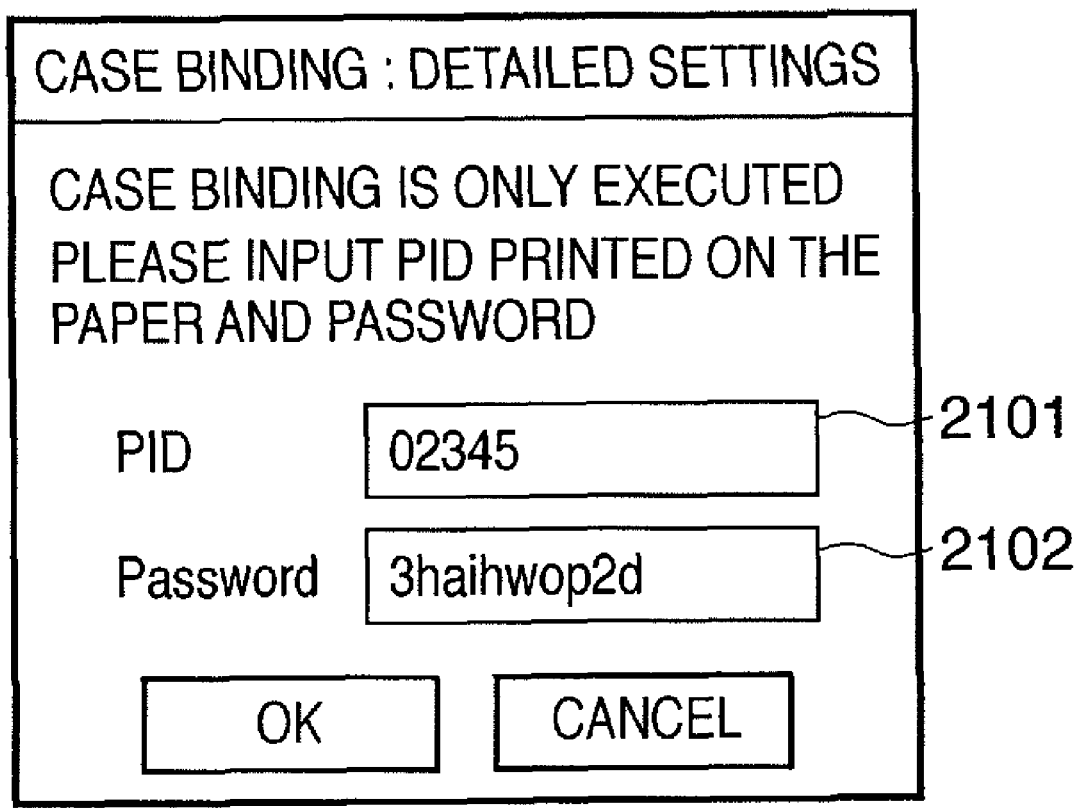
FIG. 21 depicts a view illustrating an example of a setting screen for the case binding detail settings according to the third embodiment.

FIG. 21 depicts a view illustrating an example of a detail setting screen for the case binding according to the third embodiment.

A PID and a password have been respectively inputted into an identification code input field 2101 and a password input field 2102 on the screen.

The process then proceeds to step S2210, wherein the password and the identification code that were inputted in step S2209 are checked to see whether or not they match the identification code and the password that were input on the screen depicted in FIG. 20A. If it is determined that there is a match, i.e., step S2210 is "OK," the case binding process of the sheets printed in step S2207 is executed by the case binding device 303, as per FIG. 7, step S711, and the process terminates.

If, on the other hand, it is determined that there is no match, i.e., step S2210 is "NO," the process returns to step S2209, wherein the user is once again prompted to input the password and identification code, or PID.

According to the third embodiment, it is possible to execute only a print job at a given time, and use the printed sheets to carry out a bookbinding at a later time. In such a circumstance, it is possible to easily link the printed sheets and the bookbinding process, allowing a prevention of a mistaken operation of performing the bookbinding process using wrong printed sheets. It is thus possible to build a useful, flexible printing framework that is applicable to a POD situation above and beyond an office environment.

It is possible to offer an arrangement that minimizes operator intervention that may arise in the POD situation as a consequence of a specification of the print device. An efficient operation may be achieved that reduces operator's workload.

In particular, it is possible to execute a print job that requires a specific finishing, such as a case binding, as supposed in a printing situation in the POD environment, under various specifications. Hence, it will be possible to improve efficiency and throughput when using a particular finisher. It would be possible, for example, to deal with an operator requirement for carrying out the case binding at a later time, or executing only a printing of documents initially. Administration of the identification code and the password assures that documents that are slated for the bookbinding are the documents that are supposed to be slated for the bookbinding, when performing only the case binding after printing the documents. Consequently, it is possible to reduce setting for the case binding upon executing the case binding, and reduce the workload of the operator.

It is possible to use the identification code to reissue a print job of the documents, in a case where a paper feed jam occurs in the printer, allowing execution of a recovery of printed sheets that are damaged, whether as a result of the paper feed jam or other cause. It is possible to offer an arrangement that is capable of a highly flexible response to a variety of requirements on the part of a variety of operators, envisioning a variety of circumstances or applications.

It is permissible to carry out the feature set according to the embodiment via host computer, using a program that is installed from an external source. In such a circumstance, a data is installed from the external source to display an operating screen similar to the operating screen that is described in the embodiment, including each respective operating screen, constituting each respective user interface screen in a display unit of the host computer. In such a circumstance, the present invention is applied even if an information suite, including the program, is provided to an output device from a storage medium, such as a CD-ROM, a flash memory, or a floppy disk, or from an external storage device over a network.

Other Embodiments

While the preferred embodiments of the present invention have been described herein, it is permissible to apply the present invention to a system that is constituted from a plurality of devices, as well as an apparatus that is formed from a single device.

The present invention may be achieved by supplying a software program that fulfills the feature set of the embodiment, either directly or remotely, to the system or the apparatus, and having a computer of the system or the apparatus read out and execute the program so supplied. In such a circumstance, the information need not be in the form of a program if the feature set of the program is present.

Accordingly, a program code that is installed within a computer in order to fulfill a feature set process of the present invention will itself fulfill the present invention. That is to say, the present invention also includes the computer program itself that is for the fulfillment of the feature set process of the present invention. In such a circumstance, a form of the program is irrelevant, such as an object code, a program executed by an interpreter, or a script data that is provided to the operating system, if the feature set of the program is present.

A variety of storage media may be used for supplying the program, such as a floppy disk, a hard drive, an optical disk, a magneto-optical disk, an MO disk, a CD-ROM, a CD-R, a CD-RW, a magnetic tape, a nonvolatile memory card, a ROM, or a DVD, i.e., a DVD-ROM or a DVD-R, for example.

As another method of supplying the program, it would be possible to supply the program by using a web browser on the client computer to connect to a website on the Internet, and download the program from the website to a storage medium, such as a hard disk. In such a circumstance, it is permissible for either the computer program of the present invention itself, or a compressed file with an auto-install feature, to be downloaded. Fulfillment is also possible by segmenting the program code that constitutes the program of the present invention into a plurality of files and downloading each respective file from a different website. That is to say, a World Wide Web server that downloads the program file for fulfilling the feature set process of the present invention on the computer to a plurality of users is also included within the claims of the present invention.

It is permissible for the program of the present invention to have a form of being encrypted, stored on a storage medium, such as a CD-ROM, and distributed to the user. In such a circumstance, key information is downloaded from a website over the Internet to a user who satisfies a specified condition, and the encoded program is installed in the computer in an executable format by using the key information.

Fulfillment is also possible in a form other than the form wherein the feature set of the embodiment is fulfilled by the computer executing the program that it reads out. For example, it would be possible to fulfill the feature set of the present invention by having the operating system or other program code running on the computer perform an actual process, in whole or in part, in accordance with the instruction of the program.

It is also permissible for the program that is read out from the storage medium to be written to a memory that is fitted into an expansion board that is installed into a computer, or into an expansion unit that is connected to the computer. In such a circumstance, the CPU or other device that is installed into the expansion board or into the expansion unit performs the actual process in whole or in part, in accordance with the instructions of the program, and the process fulfills the feature set of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-104718, filed Apr. 5, 2006, which is hereby incorporated by reference herein in its entirety.

What is claimed is:

1. A print system adapted to cause a print unit to perform a print process and cause a bookbinding unit to execute a bookbinding process of printed sheets upon which the print process is performed by the print unit, comprising:
 a reception unit configured to receive a specified instruction from a user interface, the specified instruction indicating that the print process is to be performed separately, rather than in sequence, from the bookbinding process; and
 a controller configured to control, if the reception unit receives the specified instruction, the print process by the print unit to be performed separately from, rather than in sequence with, the bookbinding process by the bookbinding unit,
 wherein the controller is configured to generate identifying information, in response to receipt of the specified instruction,
 wherein the controller is configured to control, if the reception unit receives the specified instruction, the print unit to perform the printing process for a particular job to print an image of the particular job and the identifying information on sheets, wherein the controller is configured to request a user input of an authentication data, after completion of the printing process for the particular job and prior to execution of the bookbinding process of the printed sheets for the particular job, and wherein the controller is configured to control, if the authentication data input by the user matches the identifying information printed on the sheets, the bookbinding unit to execute the bookbinding process of the printed sheets for the particular job.

2. The print system according to claim 1, wherein the reception unit is configured to receive the specified instruction from an external apparatus.

3. The print system according to claim 1, wherein the controller is configured to cause the print unit to print a sheet used in the bookbinding process, in accordance with the identifying information, in a case where an error in the bookbinding process occurs with the bookbinding unit.

4. The print system according to claim 1, further comprising:
a selector configured to select, according to the specified instruction, between a mode that executes the print process and the bookbinding process of printed sheets printed in the print process separately from one another, and a mode that executes the print process and the bookbinding process of printed sheets printed in the print process in series.

5. A control method for a print system adapted to cause a print unit to perform a print process and cause a bookbinding unit to execute a bookbinding process of printed sheets upon which the print process is performed by the print unit, comprising the steps of:
receiving a specified instruction from a user interface, the specified instruction indicating that the print process is to be performed separately, rather than in sequence, from the bookbinding process; and controlling, if the specified instruction is received in the receiving step, the print process by the print unit to be performed separately from, rather than in sequence with, the bookbinding process by the bookbinding unit, wherein the controlling step includes generating identifying information, in response to receipt of the specified instruction, wherein the controlling step includes controlling, if the specified instruction is received in the receiving step, the print unit to perform the printing process for a particular job to print an image of the particular job and the identifying information on sheets, wherein the controlling step includes requesting a user input of an authentication data, after completion of the printing process for the particular job and prior to execution of the bookbinding process of the printed sheets for the particular job, and wherein the controlling step includes controlling, if the authentication data input by the user matches the identifying information printed on the sheets, the bookbinding unit to execute the bookbinding process of the printed sheets for the particular job.

6. The control method according to claim 5, wherein the specified instruction is received from an external apparatus.

7. The control method according to claim 5, further comprising the step of:
executing the print process again to print a sheet used in the bookbinding process, in accordance with the identification information, in a case where an error in the bookbinding process occurs with the bookbinding unit.

8. The control method according to claim 5, further comprising the step of:
selecting, according to the specified instruction, between a mode that performs the print process and the bookbinding process of printed sheets printed in the print process separately from one another, and a mode that performs the print process and the bookbinding process of the printed sheets printed in the print process in series.

9. A non-transitory computer readable storage medium for storing a program that when executed by a computer, causes the computer to execute a control method for a print system adapted to cause a print unit to perform a print process and cause a bookbinding unit to execute a bookbinding process of printed sheets upon which the print process is performed by the print unit, the method comprising the steps of:
receiving a specified instruction from a user interface, the specified instruction indicating that the print process is to be performed separately, rather than in sequence, from the bookbinding process; and controlling, if the specified instruction is received in the receiving step, the print process by the print unit to be performed separately from, rather than in sequence with, the bookbinding process by the bookbinding unit, wherein the controlling step includes generating identifying information, in response to receipt of the specified instruction, wherein the controlling step includes controlling, if the specified instruction is received in the receiving step, the print unit to perform the printing process for a particular job to print an image of the particular job and the identifying information on sheets, wherein the controlling step includes requesting a user input of an authentication data, after completion of the printing process for the particular job and prior to execution of the bookbinding process of the printed sheets for the particular job, and wherein the controlling step includes controlling, if the authentication data input by the user matches the identifying information printed on the sheets, the bookbinding unit to execute the bookbinding process of the printed sheets for the particular job.

* * * * *